(12) United States Patent
Winterowd et al.

(10) Patent No.: US 6,489,037 B1
(45) Date of Patent: Dec. 3, 2002

(54) COATING FOR INHIBITING STAIN FORMATION IN FLOOR COVERING

(75) Inventors: Jack G. Winterowd, Puyallup, WA (US); Jerry D. Izan, Tacoma, WA (US); Charles E. Lewis, Federal Way, WA (US); Daniel V. Hanson, Auburn, WA (US); Darrell C. Roden, State Road, NC (US); Albert C. Phillips, Traphill, NC (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/387,042

(22) Filed: Aug. 31, 1999

(51) Int. Cl.$^7$ ................................................ B32B 21/08
(52) U.S. Cl. .................... 428/511; 106/286.7; 428/512; 428/514; 428/537.1; 428/537.5; 427/316; 427/317; 427/325; 427/326; 427/395; 427/396; 427/397; 427/408; 427/411; 427/419.5; 427/419.8; 524/80; 524/428; 524/435; 524/572; 524/558
(58) Field of Search .......................... 106/286.7; 524/80, 524/428, 435, 572, 558, 563; 428/511, 512, 514, 537.1, 537.5; 427/316, 317, 325, 326, 395, 396, 397, 408, 411, 419.5, 419.8

(56) References Cited

U.S. PATENT DOCUMENTS

| | | | |
|---|---|---|---|
| 3,865,775 A | * | 2/1975 | Drelich et al. ............... 524/428 |
| 3,900,620 A | | 8/1975 | Gilman et al. |
| 4,021,398 A | | 5/1977 | Gilman et al. |
| 4,218,516 A | | 8/1980 | Meyer et al. |
| 5,308,694 A | | 5/1994 | Andersson |
| 5,312,863 A | | 5/1994 | Van Rheenen et al. |
| 5,460,644 A | | 10/1995 | Thomassen |
| 5,891,294 A | | 4/1999 | Shih et al. |

* cited by examiner

*Primary Examiner*—D. S. Nakarani
(74) *Attorney, Agent, or Firm*—Christensen O'Connor Johnson Kindness PLLC

(57) ABSTRACT

A coating that inhibits stain formation in floor covering. The coating includes a copper amine complex, preferably a copper morpholine complex, and is advantageously applied to an underlayment upon which a floor covering is adhered. Coated panels and floor assemblies that include the coating are also described.

54 Claims, 3 Drawing Sheets

US 6,489,037 B1

COATING FOR INHIBITING STAIN FORMATION IN FLOOR COVERING

FIELD OF THE INVENTION

This invention relates to liquid formulations that can be applied to the surface of a wood-based flooring panel and dried to form a coated product that is suitable for use as a substrate for decorative floor covering. The coating on the panel dramatically inhibits the staining action that occurs when a decorative vinyl floor covering is installed directly over a wooden substrate. The coating system described inhibits the staining action that occurs when oriented strandboard (OSB) underlayment is used in conjunction with vinyl floor sheathing, while simultaneously providing a substrate surface that has exceptional compatibility with the adhesives and patching materials that are commonly used during the process of installing vinyl floor coverings. The coating formulations are stable and resistant to phase separation and settling over storage periods in excess of two months, and they can be used in high-volume commercial coating operations in compliance with current U.S. environmental regulations.

BACKGROUND OF THE INVENTION

Decorative vinyl floor coverings are commonly installed in residential dwellings in North America. Manufacturers of vinyl floor coverings include Armstrong World Industries (Lancaster, Pa.), Mannington (Salem, N.J.), Congoleum Corporation (Mercerville, N.J.), and Tarkett Incorporated (Whitehall, Pa.). Contemporary floor covering materials are described in U.S. Pat. No. 5,308,694. Although there are a number of elaborate vinyl floor covering construction designs, most are comprised of a three-layered structure. The bottom layer generally consists of a plasticized polymeric film, felt or paper. The middle layer is the decorative portion and it often consists of polyvinyl chloride along with plasticizing agents, dyes and/or pigments, stabilizers and/or other components. In many cases this decorative layer has a cellular structure, which is achieved by decomposing a blowing agent, most commonly azodicarbonamide, during the manufacturing process. In some cases a colored design is gravure-printed on the topside of the middle layer. A discontinuous pattern of foam inhibitor can also be deposited on the topside of the middle layer in order to yield a highly textured floor covering. The upper layer is known as the "wear layer" and it often consists of a plasticized polyvinyl chloride or polyurethane film.

Most types of vinyl floor covering are thin and very conformable. Thus, they must be installed directly over a smooth, flat substrate. Residential sub-floors consisting of ¾" OSB or plywood sub-floor panels mounted over 2"×10" joists are frequently abused during the home building process, and have surfaces which are often too rough and irregular to be used as a vinyl floor covering substrate. It is common practice to install a thin, smooth panel, known as an "underlayment panel", over the rough sub-floor just prior to installation of the vinyl floor covering. FIG. 1 shows a representative floor construction (10) in which a layer of vinyl floor covering (20) is adhered to a layer of underlayment panels (30), which are stapled or nailed to ¾" thick sub-floor panels (40), which span and are nailed to 2"×10" supporting joists (50). Typical underlayment panels are sanded and comprised of plywood, particleboard, oriented strand board (OSB), or cement/fiber board. Plywood underlayments that are commonly used in North America include those derived from lauan veneer and manufactured in Indonesia and Malaysia. A plywood underlayment, known as MULTIPLY, is composed of aspen veneer and is manufactured by MacMillan Bloedel Ltd. (Vancouver, BC). Another plywood underlayment, known as TECHPLY, is composed of Russian birch veneer and is distributed in North America by the Plywood & Doors Mfrs. Corporation (Union, N.J.). A sanded ⅜" thick fiberboard, known as FIBERFLOR, is manufactured by MacMillan Bloedel Ltd. (Vancouver, BC). A coated ¼" thick OSB underlayment panel known as THE INSTALLER'S EDGE is manufactured and sold by the Weyerhaeuser Co. (Tacoma, Wash.). A ⅜" thick cement/fiber board, known as FIBERBOND, is sold as underlayment by the Louisiana-Pacific Corporation (Portland, Oreg.).

All of these commercial underlayment panels have structural properties that are sufficient for an underlayment application. The panels must also have a smooth, flat, dimensionally stable, hard surface for the duration of their use in a floor system. The typical installation practice includes fastening the underlayment panels to the sub-floor by use of staples or nails; patching the seams; removing any debris from the surface of the panels; and adhering the vinyl floor covering to the underlayment by use of aqueous latex adhesives. Thus, the panels should have a solid, uniform color and appearance in order to aid in the visualization of fastener placement and surface debris when cleaning the panels. The panels must not corrode or degrade metallic fasteners. The panels must be fully compatible with conventional patching compounds and adhesives that are used during the floor covering installation process. The panels must not stain or otherwise adversely interact with the vinyl floor covering that is placed directly on top of them. Underlayment panel attributes that are particularly important and relevant to this invention include 1) compatibility with the commonly used aqueous latex adhesives and patching compounds and 2) an ability to resist staining vinyl floor coverings.

Compatibility with aqueous latex adhesives. The surface of the installed, underlayment must be receptive and functionally compatible with a large number of water-based adhesives that are used to attach the vinyl floor covering to the underlayment. Most of the adhesives are primarily comprised of aqueous acrylic or styrene-butadiene lattices, which are designed to absorb into the underlayment. Thus, the underlayment must have a surface, which will allow some penetration of a water-based adhesive.

One type of vinyl floor covering, known as "fully-adhered", requires the application of adhesive across the entire underlayment surface. In this case the adhesive must be spread by use of a trowel with repeated stroking actions. Applied adhesive on one part of a floor must remain in a liquid state for a period of time sufficient for the installer to spread the adhesive across the entire floor. Thus, the adhesive must interact with the underlayment panels in a manner that results in a sufficiently long "open-time". Interactions between the adhesive and the underlayment surface must not cause the adhesive to prematurely solidify. Simultaneously, bond strength must develop between the vinyl floor covering and the underlayment panel within a reasonably short time period after the vinyl floor covering has been placed in intimate contact with the adhesive on top of the underlayment. This bond strength must increase to a level that secures the vinyl floor covering to the underlayment subsequent to installation. Therefore, interactions between the applied adhesive and the underlayment surface must not impede or interfere with bond strength development.

A second type of vinyl floor covering, known as "perimeter-attached", requires application of an adhesive only at the perimeter of the floor. The perimeter-attached vinyl floor covering is laid onto the floor and positioned into the applied adhesive. In this application it is important that a strong bond quickly develop between the vinyl floor covering and the underlayment along the perimeter of the floor. Immediately after installation a volatile component in the vinyl floor covering will begin to evaporate and the floor covering will simultaneously shrink. As shrinkage occurs a strong shear stress is developed along the perimeter bond. It is vital that the bond strength along the perimeter of the floor-to-vinyl interface be sufficiently high to prevent delamination during this shrinking process.

Ability to bond with aqueous patching compounds. Patching compounds are often applied along the seams between the underlayment panels. Most patching compounds are prepared by mixing either Portland cement or gypsum with either water or an acrylic latex. Examples of commercial patching compounds that are utilized with underlayment panels and vinyl floor covering are MAPEI PLANI/PATCH from Mapei Inc. (Montreal, PQ, Canada), S-184 from Armstrong World Industries (Lancaster, Pa.) and DEPENDABLE SKIMCOAT from the Dependable Chemical Company, Incorporated (Rocky River, Ohio). It is important that these patching compounds bond to the underlayment. In general this requires that the water-based, patching compound be capable of penetrating or absorbing into the underlayment.

Ability to resist fastener corrosion. Underlayment panels are generally installed directly over structural subfloor panels and are fastened to the subfloor by use of metallic nails or staples. These metallic fasteners must not be corroded by the underlayment panel.

Ability to resist staining vinyl floor covering. Most underlayment panels for vinyl floor covering are comprised of wood laminates or composites. Wood is known to contain an array of extractives. Under conditions of elevated temperatures and high humidity some of these extractives appear to be able to migrate out of the wood and absorb into the vinyl floor covering where they can cause a stain. Underlayment composed of aspen wood appears to be particularly prone to staining vinyl floor covering. OSB underlayment, which contains aspen bark or wood isolated from the cambium layer of an aspen log is most prone to staining. Woods isolated from pine, maple, black poplar, cottonwood, walnut, hickory, elm and other species also contain extractives that are capable of staining vinyl floor coverings. Homeowners cannot remove this type of stain. Resolution generally requires replacement of the vinyl floor covering.

Some vinyl floor coverings are very susceptible to stain formation, while others are quite resistant to "bottom-up" staining even when they are placed in contact with an aspen substrate in an environment of high temperature and high relative humidity. In general we have found that thin, perimeter-attached type vinyl floor coverings are more prone to develop stains from contact with floor underlayment than are fully-adhered vinyl floor coverings. Also the stains observed in perimeter-attached vinyl floor covering tend to develop more rapidly and they are more intense than stains that develop in most fully-adhered vinyl floor coverings. Additionally, we have found that vinyl floor coverings with cellular decorative layers have a greater propensity to stain than do vinyl floor coverings with no cellular layer. It is suspected that plasticizing agents in the vinyl floor covering help to facilitate the transfer of extractives into the vinyl. It is further suspected that residual azodicarbonamide or its decomposition products in the cellular layer of the vinyl floor covering reacts with some wood extractives to form intensely dark products, which manifest themselves as stains.

Potential solutions to the staining problem. The vinyl floor covering manufacturers are aware of the "bottom-up" staining problem and they have diligently searched for a practical, cost-effective solution. The aforementioned U.S. Pat. No. 5,308,694 assigned to Tarkett describes a vinyl floor covering in which a barrier layer of plastisol and water glass are incorporated into a layer that is positioned on the bottom side of the vinyl floor covering or somewhere between the bottom side and the decorative layer. This "barrier" layer reportedly prevents wooden underlayments from causing a top-side stain in the vinyl floor covering. The inventors suggest that organic stainants from the underlying floor are unable to migrate or diffuse through the barrier layer.

U.S. Pat. No. 5,891,294, assigned to Mannington, describes a vinyl floor covering in which a barrier layer consisting of a polyurethane or a polyamide is preferably positioned between the backing layer and the middle layer of the vinyl floor covering.

The inventions described is U.S. Pat. Nos. 5,308,694 and 5,891,294 appear to be too expensive to practice and these technologies have not been implemented by Tarkett, Mannington, or any of the other floor covering manufacturers.

It should also be noted that there are complications associated with applying these vinyl stain-blocking technologies to wooden underlayment products. For instance, when water glass is applied to a wooden underlayment as a coating, it forms a surface, which is not compatible with many of the conventional adhesives that are used to secure the vinyl floor sheathing during the installation process. More specifically, many latex adhesives will prematurely solidify or coagulate when applied to the water-glass coating. In fact, application of many alkaline coating systems to wooden underlayment panels generally makes the surface of the coated panel incompatible with at least some of the conventional adhesives that are used to secure the vinyl. Thus, water-glass is not suitable for use as a stain-blocking coating on a wood-based underlayment panel.

Several years ago it became known that placement of a continuous sheet of aluminum foil between a wooden substrate and the vinyl floor covering completely prevented the wood from staining the floor covering. Unfortunately, the water-based adhesives and patching compounds that are used to attach the vinyl floor covering to the wooden underlayment will not bond to the aluminum. Furthermore, the aluminum foil is expensive and susceptible to small tears or punctures. Wood extractives are capable of diffusing into the vinyl floor covering at locations in the aluminum barrier where it has been torn or perforated. Consequently, neither the vinyl floor covering manufacturers nor the underlayment manufacturers have incorporated aluminum foil barriers into their products to prevent the staining problem. Additionally, installers generally do not to position a layer of aluminum foil between the underlayment and the vinyl floor covering.

There are a number of Portland cement patching compounds that are effective stain-blocking materials when they are applied to the wooden underlayment as a top surface coating at a spread rate of about 16 wet $g/ft^2$ or greater. Examples of such patching compounds are the previously mentioned MAPEI PLANI/PATCH by Mapei Inc. (Montreal, PQ, Canada) and ARDEX FEATHER-FINISH CEMENT produced by Ardex, Inc. (Coraopolis, Pa.). A small number of installers will apply the patching compound over the entire underlayment surface prior to vinyl floor covering installment in order to prevent the wood from staining the floor covering. Unfortunately, this practice is labor intensive and is not widely utilized. Although a Portland cement can be manufactured that could be mixed with water or an aqueous latex and then applied to the wooden underlayment by use of a roll-coating machine, the limited pot-life and high viscosity of the cement mixture makes the roll-coating machine very susceptible to fouling when the operation is conducted on a continuous, long-term basis. Also, it should be noted that the Portland cement based patching materials are highly alkaline in nature. After a 1–2 week equilibration period the cement coating becomes incompatible with a number of the conventional adhesives used to secure the vinyl to the underlayment. Thus, a Portland cement based coating appears not to be a suitable material for preparing a factory-coated underlayment panel.

Formulations that have been designed for use as primer coats over redwood, cedar or pine boards do not appear to be suitable for use as a coating over a wood-based floor underlayment panel. Such formulations are designed to be applied directly onto solid wood articles that have high concentrations of tannin, tocopherol or other intensely colored extractives. The primer formulations contain stain-blocking components, which will selectively react with and immobilize the colored extractives in the wood. Subsequent to application and drying of the primer coat, the board can be coated without discoloring the paint by transfer of the colored extractives into the paint. Although some of these "paint primers" do have some ability to prevent OSB underlayment from staining vinyl floor sheathing, they generally yield a coated surface that is not compatible with many of the adhesives and patching compounds that are used in the floor installation process. Thus, the stain-blocking technologies that have been developed for paint primers are not generally suitable for application to a floor underlayment panel that is used in conjunction with vinyl floor sheathing.

One example of a paint primer formulation is that described by Thomassen in U.S. Pat. No. 5,460,644. The formulation described in this patent preferably contains a soluble zinc ammonium complex, which prevents wood extractives from staining freshly applied paint. Unfortunately, stain-blocking compounds for underlayment based on water-soluble salts are notorious for coagulating water-based vinyl adhesives immediately upon application to the underlayment.

Another example of a paint primer formulation is that described by Gilman et al. in U.S. Pat. Nos. 3,900,620 and 4,021,398. The formulation described in these patents preferably contains an aluminum hydroxychloride complex, which reportedly prevents wood extractives from staining freshly applied paint. OSB underlayment panels coated with aqueous solutions of aluminum hydroxychloride demonstrate gross incompatibility with many aqueous adhesives that are used to secure vinyl floor coverings. Aluminum hydroxychloride has little or no stain-blocking efficacy when applied to OSB panels that are used as underlayment panels for vinyl floor covering.

Yet another example of a paint primer formulation is that described by Meyer et al. in U.S. Pat. No. 4,218,516. The formulation described in this patent preferably contains magnesium hydroxide at a 1–10% level, which prevents wood extractives from staining freshly applied paint. Unfortunately, formulations that contain magnesium hydroxide at a loading level of 1–10% do not yield effective stain-blocking coatings at spread rates of 15 $g/ft^2$ or less, which is a level that can be reasonably achieved in a commercial operation. Formulations with magnesium hydroxide concentrations of 25–30% solidify in less than one day of storage, which makes them difficult to utilize in a commercial coating operation. Stable formulations based on U.S. Pat. No. 4,218,516 are limited to magnesium hydroxide concentrations of $5\%$ or less. Unfortunately, stain-blocking formulations that contain only 5% magnesium hydroxide must be applied at spread rates of approximately 50 $g/ft^2$ on OSB panels in order to prevent vinyl discoloration. Such a high spread rate is not commercially feasible. An additional complication with the magnesium hydroxide-based coatings relates to the fact that aqueous suspensions of magnesium hydroxide are alkaline. Wooden panels treated with these suspensions and equilibrated for at least 1 week are incompatible with a number of the water-based adhesives that are used to secure vinyl floor sheathing.

A further example of a paint primer formulation is that described by Van Rheenen et al. in U.S. Pat. No. 5,312,863. The formulation described in this patent contains a latex with amine functionality, which prevents wood extractives from staining freshly applied paint. Application of non-complexed amines to OSB panels does not prevent the discoloration that generally occurs when the OSB is placed in contact with vinyl floor coverings.

As previously noted, the paint primer formulations were designed for an application pertaining to the wood/paint interface, which is distinctly different than that of a stain-blocker for the interface between vinyl floor sheathing and wooden OSB underlayment.

SUMMARY OF THE INVENTION

In one aspect, the present invention allows for the convenient conversion of wooden underlayment panels, especially OSB panels, that are prone to staining vinyl floor covering into coated panels that will not stain vinyl floor covering. Furthermore, this is accomplished without adversely impacting the compatibility of the underlayment panel with aqueous latex adhesives, patching compounds, metallic fasteners or vinyl floor coverings. In another aspect, a treatment process is provided that utilizes safe, single-component, liquid formulations that are stable under typical storage conditions (5–40° C.) for at least 6–8 weeks and have Theological properties that are appropriate for commercial roll-coating and curtain-coating equipment.

Wooden underlayment panels that are prone to staining vinyl floor sheathing under conditions of elevated temperatures and high relative humidity are sequentially coated with two distinct formulations. The first formulation is applied directly on top of the virgin underlayment panel to form a coat. The formulation includes an aqueous dispersion of a copper/amine complex. Typically, this first coating is dried on the panel to form a basal (or bottom) layer (or stratum) and a second coating formulation is applied on top of the basal layer. The second formulation is predominantly comprised of water, calcium carbonate and an inert, non-ionic latex or other binder material. The applied second formulation is then dried on top of the basal layer to form a supra (or top) layer (or stratum). The coated panel is highly resistant to staining vinyl floor coverings and it is fully compatible with commonly used aqueous latex adhesives, patching compounds, metallic fasteners and vinyl floor coverings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention relates to a set of coating formulations that can be applied to a wooden underlayment panel and dried to yield a product that is fully compatible with aqueous latex adhesives that are typically used to adhere vinyl floor sheathing to wooden underlayment panels. The coated panel is also substantially resistant to staining vinyl floor covering even when the floor is exposed to an environment of elevated temperature and high relative humidity. As used herein, the term "vinyl floor covering" refers to polyvinyl chloride-based floor covering, and the term "covering" is used interchangeably with the term "sheathing".

Wooden underlayment panels that are suitable for this invention include those composed of oriented strandboard, particleboard, medium density fiberboard, plywood or any other wooden panel or board material that is utilized in a flooring system and is positioned just beneath decorative vinyl floor covering. Panels or boards, which are only partially composed of wood can also be used in this invention. The dimensions of the underlayment panel or board are not critical to this invention, but thickness values between ⅛" and 1-¼" will most generally be utilized. Width and length dimensions will most commonly be 4'×8', but other dimensions could be used.

Figure 1:
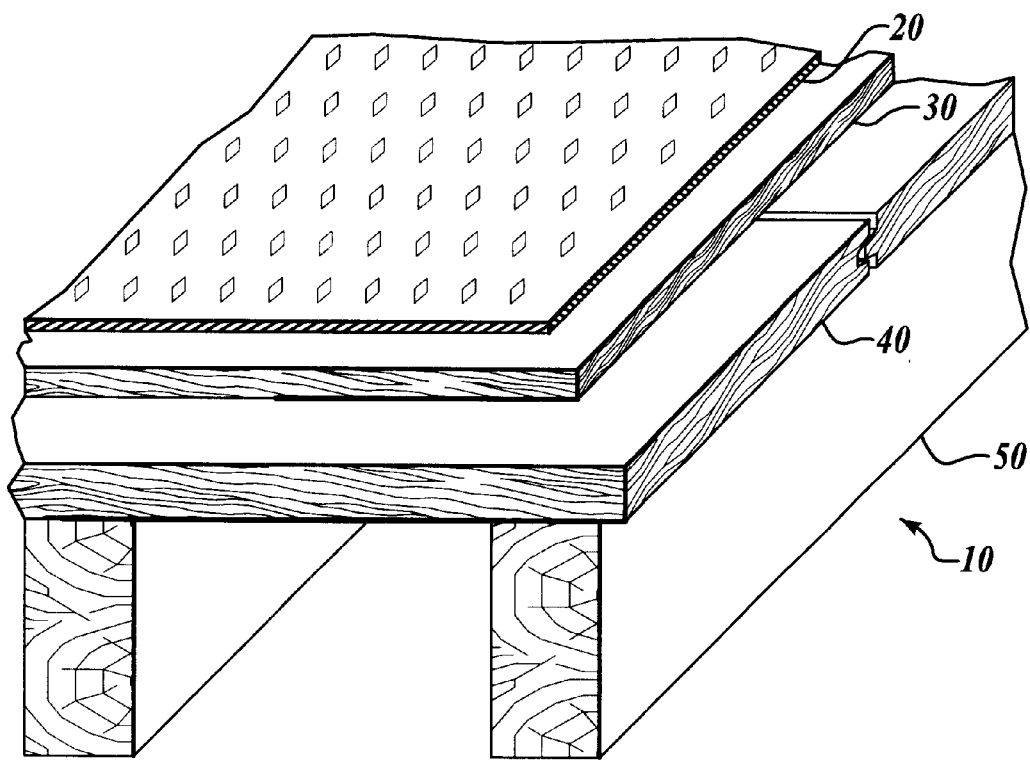
FIG. 1 is a perspective view of a typical floor including a subfloor, underlayment, and floor covering.
Figure 2A:
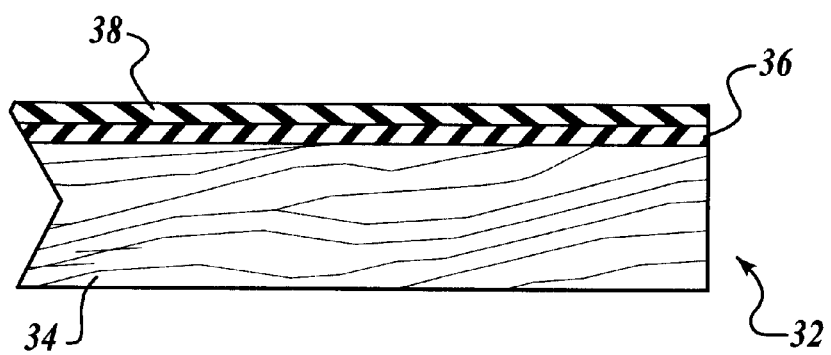
FIGS. 2A–2D are cross-sectional views of representative coated panels formed in accordance with the present invention.

The coating comprises a basal stratum (bottom layer) formed from a first formulation and a supra stratum (upper layer) formed from a second formulation. Referring to FIG. 2A, coated panel 32 includes underlayment 34, basal stratum 36, and supra stratum 38.

The basal stratum includes a copper/amine complex and a binding agent. The concentration of the copper/amine complex is sufficient to provide the desired level of stain prevention in the coated underlayment panel. Typical levels of the copper/amine complex in the basal stratum are 5–20%.

The copper/amine complex is generally formed in situ as the basal stratum formulation is being prepared. It is most convenient to sequentially charge a blending vessel with water, binder agent, and any other desired formulation additives. The contents of the vessel are homogenized subsequent to each addition. A water-soluble copper salt is then added to the vessel and the formulation is stirred until the copper salt is dissolved. Appropriate copper salts include copper (II) chloride and copper (II) nitrate, among others. Alternatively, an aqueous solution of a copper salt can be added to the formulation. After the copper has been solubilized and homogeneously incorporated into the formulation, an amine is added to the formulation with continuous stirring to form the copper/amine complex. The amount of amine should most preferably be in the range of 1–4 moles of amine per 1 mole of copper. Suitable amines for the basal strata formulation include morpholine, triethanolamine, diethanolamine, ethanolamine, ammonia, m-phenylenediamine and dimethylamine. Morpholine is a preferred amine for this formulation. A highly preferred basal strata is based on a ratio of 1 mole of copper salt to 1.3–4 moles of morpholine. Preferably, the copper/morpholine complex is present in the basal stratum at a level of about 14–18%.

The binding agent is preferably an aqueous, non-ionic latex, but solutions of other polymers or resins can also be used. Suitable binding agents could include acrylic latex, styrene-butadiene latex, and polyvinyl acetate latex. Aqueous solutions of polymers are suitable as binding agents, especially if they are combined with a cross-linking agent that is activated upon drying. Examples of such polymers include starch, carboxymethyl cellulose, hydroxyethyl cellulose, guar gum and xanthan gum. Suitable crosslinking agents include formaldehyde or glutaraldehyde. Alternatively, aminoplast resins, such as urea/formaldehyde or melamine/formaldehyde resins are suitable as binding agents. Anionic lattices and anionic binding agents should be avoided because they have detrimental effects on the adhesive compatibility properties of the coated underlayment panel. The binding agent is preferably a stable solute or homogeneously dispersed phase during the storage life of the basal formulation. The binding agent preferably secures all of the solid, suspended particles in the coating formulation to the underlayment substrate subsequent to application and drying. A preferred binding agent is a carboxylated styrene-butadiene latex with a surfactant system that is mostly nonionic. Generally the binding agent is present in the basal stratum formulation at a level of 20–80 percent by weight, more preferably, 35–45 percent by weight based on the total weight of the formulation.

Other additives that can be incorporated into the basal stratum formulation include viscosifying agents, fillers, surfactants, pigments or other types of colorants, opacifying agents, preservatives, defoaming agents and/or any additive that improves the shelf-life or rheology of the formulation for the intended method of application to the underlayment substrate. Small amounts of metal ion complexing agents such as, for example, melamine can be added to the basal stratum formulation in order to improve the adhesive compatibility properties of the coated underlayment panel. A preferred basal stratum formulation includes water (15–50%), a viscosifying agent (1–10%), colorant (0–5%), opacifying agent (0–20%), a binding agent (20–50%), copper/amine complex (5–20%), and a metal ion scavenger (1–10%). A more preferred basal stratum formulation includes water (18–25%), a polysaccharide-based viscosifying agent (1–2%), aqueous pigment dispersion (2–8%), a nonionic surfactant (0.1–2.0%), a nonionic latex (3545%), a copper/morpholine complex (7–18%), a fumed silica viscosifying agent (1–2%), an opacifying agent (10–20%), and melamine (1–5%).

The supra stratum formulation preferably dries into a coating that has a pH value that is close to neutral (i.e., pH=6–8). The dry supra stratum coating preferably strongly bonds to the basal stratum coating, and includes concentration of water-soluble salts that is sufficiently small to allow it to interact with aqueous latex adhesives without significantly increasing the ionic strength of the adhesive and causing coagulation. The supra stratum formulation includes water, an aqueous nonionic binder material and an inert solid filler. A preferred inert binder material suitable for the supra stratum is a nonionic, self-crosslinking latex. Another preferred inert solid filler is calcium carbonate. Calcium sulfate, clay or any dispersible inert, insoluble particle can be used. Other additives such as surfactants, viscosifying agents, preservatives, colorants, opacifying agents, defoaming agents, stabilizing agents, or processing aids can be included. A preferred supra strata formulation consists of water (15–35%), a viscosifying agent (1–3%), a surfactant (0.1–2%), a preservative (0.1–1.0%), an aqueous nonionic self-crosslinking latex (35–55%), and inert, insoluble fine filler particles (25–50%).

The basal and supra strata formulations can be applied to the wooden underlayment panel by use of a spray gun, a roll-coating machine including direct roll coating and reverse roll filling machines, a curtain-coater, a slot-coater, or any other liquid application equipment. It is advantageous to adjust the viscosity of each coating formulation to a level that is convenient for the specified application equipment and technique. For instance, relatively high viscosity values are helpful when a formulation is being applied to a substrate by use of a roll-coating machine. In contrast, relatively low viscosity values are desired when a formulation is being applied by use of a spray gun or a curtain-coating machine. When a formula is being applied with a curtain-coating machine, the surface tension properties are particularly important. Surface tension values are generally manipulated by use of surfactants. In order to maximize favorable interactions between the coating system and the aqueous latex adhesives, it is best to use nonionic surfactants in both the basal and supra strata formulations.

Figure 2B:
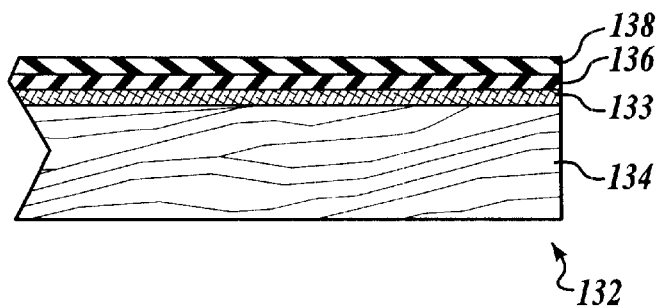

The basal stratum formulation will most commonly be applied directly to the wooden underlayment (see, e.g., FIG. 2A), although it is conceivable that some other material or layer, such as a resin impregnated paper, can be attached to the wooden underlayment directly to provide a panel having a layer intermediate the wood panel and basal stratum. Referring to FIG. 2B, coated panel 132 includes underlayment 134, intermediate layer 133, basal stratum 136, and supra stratum 138. When the wooden underlayment is pretreated with some other coating material or laminated with a resin impregnated paper, the basal stratum formulation is applied to the exposed side of the primary coating material or paper laminate. The required amount of basal stratum formulation to be applied to each unit area of wooden underlayment is dependent upon the concentration and type of stain blocking agent(s) in the formulation; the amount and type of extractives in the wooden underlayment; the type of vinyl floor covering used on top of it; and the environmental conditions (temperature and relative humidity) of the finished floor over the duration of its use. General spread rate values for the basal stratum formulation are about 1–15 g/ft$^2$. More typical spread rate values for the basal stratum formulation are about 2–6 g/ft$^2$. The applied basal stratum formulation should preferably completely cover the top major face of the underlayment panel.

Figure 2C:
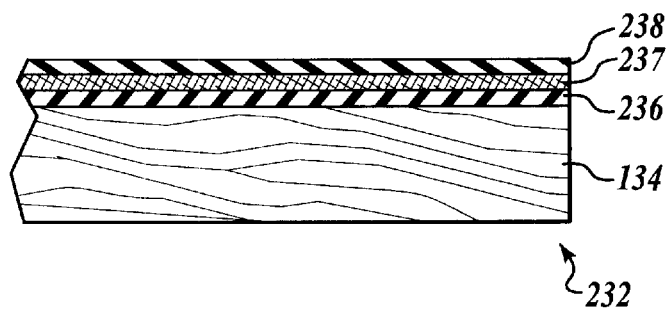
Figure 2D:
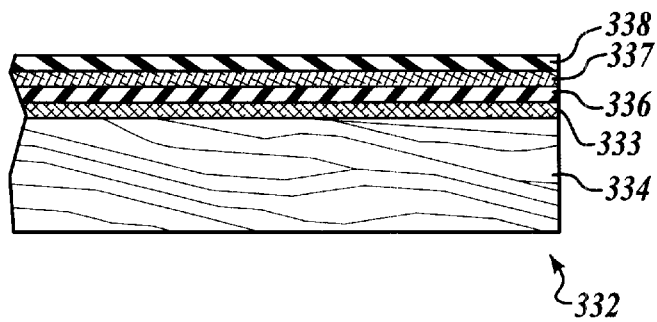

The supra stratum is placed on top of the basal strata so that the basal stratum coating is positioned between the wooden underlayment and the applied supra stratum coating. The basal stratum formulation can be directly applied to the wooden underlayment followed by attachment of a resin impregnated paper or some other coating material directly over the basal strata coating layer. The supra stratum formulation can then be applied directly onto the impregnated paper or other coating material. The coated panel can include a layer intermediate the basal and supra strata. Referring to FIG. 2C, coated panel 232 includes underlayment 234, basal stratum 236, intermediate layer 237, and supra stratum 238. The coated panel can also include layers intermediate the wood panel and basal stratum and intermediate the basal and supra strata. Referring to FIG. 2D, coated panel 332 includes underlayment 334, first intermediate layer 333, basal stratum 336, second intermediate layer 337, and supra stratum 338. Other coating layer configurations will be apparent to those skilled in the art and are considered to be within the scope of the present invention. The required amount of the supra stratum formulation is essentially that which will eliminate any incompatible interactions between an aqueous latex adhesive and the coated panel which would normally occur if the underlayment was coated with only the basal strata formulation. Typical supra stratum formulation spread rates are 2–12 g/ft$^2$. Preferred supra stratum formulation spread rates are 4–6 g/ft$^2$.

In another aspect, the present invention provides a coated panel. The panel includes a wood-based panel having a wood member with a major surface coated with the coating described above.

In a further aspect of the invention, a floor assembly is provided. The floor assembly includes a floor covering adhered to a wood-based panel having a wood member with a major surface coated with the coating described above.

EXAMPLE 1

The Preparation and Characteristics of Representative Basal and Supra Strata Formulations and Coatings Prepared Therefrom In this example, the preparation and characteristics of representative basal and supra strata formulations are described. Coatings prepared from these formulations and their ability to inhibit stain formation in overlaying vinyl floor coverings is also described. For these representative coatings, the copper amine complex was a copper morpholine complex.

Basal stratum formulation. A basal stratum formulation that exhibits excellent shelf-life during storage; and has a set of rheological properties that are appropriate for application to an OSB underlayment panel with a reverse-roll-filling-machine; dramatically inhibits a pine-based OSB panel from staining a vinyl floor covering under conditions of elevated temperatures and high relative humidity values; and forms a coating layer that can be covered with the aforementioned supra strata to yield a two strata coating that is perfectly compatible with vinyl adhesives, patching compounds and metallic fasteners was prepared according to the following procedure.

A 1-liter Waring blender was charged with water (250.0 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (5.0 parts by weight), Sunsperse BHD-6000 phthalo blue dispersion (0.3 parts by weight), and Sunsperse LHD-9303 carbon black dispersion (0.4 parts by weight) were added to the blender and the mixture was stirred for at least 60 s. A non-ionic, carboxylated styrene-butadiene resin (SBR) latex (400.0 parts by weight), known as Tylac 97422-20 from Reichhold Chemicals Inc. (Dover, Del.) was then added to the blender and the contents were stirred for at least 30 s. Copper (II) nitrate trihydrate (70.0 parts by weight) from Shepherd Chemical Company (Cincinnati, Ohio) was added to the blender and the mixture was stirred for at least 60 s. Cab-O-Sil EH-5 (6.0 parts by weight), a porous, precipitated silica powder from Cabot Corporation (Tuscola, Ill.), was added to the blender and the mixture was stirred for at least 60 s. Morpholine (70.0 parts by weight) was added to the blender and the mixture was stirred for at least 60 s. Titanium dioxide powder (150.0 parts by weight), known as Tronox CR-822, available from Kerr-McGee (Oklahoma City, Okla.), was added to the blender and the mixture was stirred for at least 60 s. Superfine melamine powder (33.3 parts by weight), available from Melamine Chemicals Inc. (Donaldson, La.), was added to the blender and the mixture was stirred for at least 120 s.

Supra stratum formulation. A supra stratum formulation that has excellent shelf life during storage; has rheology and surface tension properties that are appropriate for application to an underlayment panel by use of a curtain-coating machine; and provides a coated underlayment surface that is highly compatible with the typical aqueous latex adhesives that are used to adhere vinyl floor coverings to wooden underlayment panels was prepared according to the following procedure.

A 1-liter Waring blender was charged with water (215.5 parts by weight) and RCN-30 Avicel (16.5 parts by weight), a blend of xanthan gum and microcrystalline cellulose produced by FMC Corporation (Philadelphia, Pa.) and the mixture was stirred for 2 minutes at the highest rate of shear. A non-ionic surfactant, Surfynol 104 PA (3.0 parts by weight) available from Air Products and Chemicals, Inc. (Allentown, Pa.) was added to the blender and the mixture was stirred for an additional 60 s. Ethylene glycol monobutylether (10.0 parts by weight), available from Dow Chemical Inc. (Midland, Mich.), was added to the blender and the mixture was stirred for an additional 60 s. A preservative, known as Dowicil 75 (1.0 parts by weight) available from Dow Chemical Inc. (Midland, Mich.), was added to the blender and the mixture was stirred for an additional 60 s. A fine calcium carbonate powder, OMYACARB 3 (304.0 parts by weight) available from Omya Inc. (Proctor, Vt.), was added to the blender and the mixture was stirred for an additional 60 s. A non-ionic, carboxylated SBR latex (450.0 parts by weight), Tylac 97422-21 from Reichhold Chemicals Inc. (Dover, Del.), was added to the blender and the contents were stirred for at least 90 s.

Basal and supra strata formulation gel strength. Replicate batches of the basal and supra strata formulations were prepared and stored in closed containers at a temperature of 20° C. for an eight-week period. Neither formulation demonstrated any phase separation or settling of suspended material during this storage period. At weekly intervals each batch was examined and then gently stirred and subjected to a viscosity measurement by use of an Electronic Thomas Stormer Viscometer by the Cannon Instrument Co. (State College, Pa.). The basal stratum formulation had viscosity values that ranged from 71–89 Krebs units throughout the course of the experiment. The viscosity value seemed to be highly dependent upon the amount of manual stirring prior to each measurement. The supra stratum formulation had viscosity values that ranged between 55 and 58 Krebs Units throughout the eight-week period. Similar basal and supra strata formulations were prepared, stored at 20° C., and subjected to a gel strength measurement at weekly intervals. For this experiment, the gel strength was measured by inserting a metal probe (cylindrical shape and diameter of 1.0") into an aliquot of undisturbed sample (500 g) at a constant rate of 1.0 inch/minute. The force exerted at a penetration depth of 0.75" is taken as the gel strength. Gel strength values provide an indication of the difficulty in pumping a batch of stored formulation from a storage tote to an application machine. Formulations that have gel strength values in excess of about 3 lbf (pounds force) are not preferred for this invention. The gel strength technique has the key advantage of not being influenced by variations in the degree to which an operator stirs the sample prior to the measurement. The gel strength values of the basal strata are displayed in Table 1.

TABLE 1

Gel strength values of basal stratum formulation stored at 20° C.

| Storage Time (weeks) | Gel Strength (lbf) |
| --- | --- |
| 1 | 0.09 |
| 2 | 0.15 |
| 3 | 0.16 |
| 4 | 0.25 |
| 5 | 0.20 |
| 6 | 0.19 |
| 7 | 0.18 |
| 8 | 0.18 |

Another set of the basal stratum and supra strata formulations were prepared and stored at a constant temperature of 40° C. At the higher storage temperature a significant decrease in the viscosity value of the supra stratum formulation was observed within 2 weeks and some settling of the suspended material was observed after 3 weeks. The higher storage temperature of the basal stratum formulation was associated with gel strength values that were initially high and then decreased (see Table 2). Thus, both the supra stratum and basal strata formulations were less stable at the higher storage temperature.

TABLE 2

Gel strength values of basal stratum formulation stored at 40° C.

| Storage Time (weeks) | Gel Strength (lbf) |
| --- | --- |
| 1 | 0.44 |
| 2 | 0.61 |
| 3 | 0.24 |
| 4 | 0.25 |
| 5 | 0.26 |
| 6 | 0.17 |
| 7 | 0.15 |
| 8 | 0.13 |

Samples of formulation were also subjected to freeze/thaw cycles. The basal stratum formulation was able to withstand 1, but not 2, freeze thaw cycles before sediment formation and liquid/liquid phase separation were observed. The supra stratum formulation demonstrated sediment formation and liquid/liquid phase separation after just one freeze/thaw cycle.

Basal and supra strata formulation settling resistance. Samples of both formulations were also subjected to a settling resistance test in which aliquots of formulation were packaged in sealed containers and then agitated for three days in a model RX-86 Sieve Shaker from W. S. Tyler Co. (Mentor, Ohio). The test is designed to simulate the vibrational action that occurs when totes of formulation are shipped long distances by trucks. Neither the supra nor the basal strata formulations showed any liquid/liquid phase separation or sediment formation when the samples were examined at the end of the test.

The test results gathered during these shelf life tests show that the basal and supra strata formulations retain their initial rheology properties and other characteristics sufficiently well during normal storage conditions to make them suitable for a commercial production operation. Although exceptionally cold or hot storage conditions should be avoided, a storage life of at least two months can be expected when the formulations are stored at a temperature of about 20° C.

Basal and supra strata formulation coating. The basal stratum formulation had rheological properties that made it particularly suitable for application to the top major surface of an OSB underlayment panel by use of a reverse roll-filling machine such as that manufactured by the Black Brothers Co. (Mendota, Ill.). This machine was used to apply the basal stratum formulation to the top major surface of OSB underlayment panels with dimensions of ¼"×4'×8' at a spread rate of 3 wet g/ft$^2$. The strands in the OSB consisted primarily of southern yellow pine wood. The applied basal stratum coating was partially dried by heating the treated panel for 10 s in a forced-air oven that had an air temperature of 350° C. The upper major surface of these same panels was then coated with the supra stratum formulation by use of a curtain-coating machine. The curtain-coating machine consisted of a formulation reservoir, a pump, an application head and a collection pan. Supra stratum formulation was pumped up into the application head where it was collected in a long trough, which spanned more than the width of the underlayment panel. Excess formulation in the head accumulated and spilled down a vertical, metal face, then fell a distance and into a collection system for recycling. Between the bottom of the metal face and the collection system the falling formulation formed a sheet or a curtain, like a waterfall. Panels to be coated were transported through this curtain and were thus coated on the top major surface at a spread rate of about 6 wet g/ft$^2$. The applied supra strata coating was partially dried by heating the treated panel for 20 s in a forced-air oven that had an air temperature of 350° C. The supra stratum coating dried essentially clear and colorless, while the basal stratum coating was green and opaque. The coating layers were intimately bound to each other as well as the wooden underlayment.

Adhesive Compatibility. Common, commercially available adhesives, which are typically used to adhere vinyl floor sheathing to wood based underlayment panels, were evaluated for their compatibility with the surface of the coated underlayment panels. The adhesives included Henry's 270, Henry's 356, S-220, S-235, S-254, S-665 and S-670, which are (including Henry's) produced by Armstrong World Industries (Lancaster, Pa.); V-61 and V-81, which are produced by Mannington (Salem, N.J.); FB-1, VINYLBOND, FB-600 and FB6-P, which are produced by Tarkett Inc. (Whitehall, Pa.); and 3044 and 3080, which are produced by the Congoleum Corp. (Mercerville, N.J.). All of these adhesives were applied in aliquots of about 30 g to coated and uncoated sections (1'×1') of the OSB underlayment panel. During each evaluation the adhesive was stroked across the board in both vertical and horizontal directions by use of a trowel. One stroke was defined as the action of contacting the trowel on the sample surface at a location away from the operator and dragging the trowel towards the operator's body. The trowel was then lifted off of the board and carried back to the original starting point in preparation for the subsequent stroke. The stroke orientation was rotated 90 degrees after every four strokes. A total of 240 strokes were conducted for the Armstrong and Henry adhesives, while 160 strokes were conducted for the other adhesives. Each of the adhesives was evaluated for the following failure modes:

"Coagulation" defined as the immediate solidification or gross phase separation of the latex adhesive while it was being stroked across the sample surface.

"Bubble-Gumming" defined as the conversion of the latex adhesive into a rubbery, elastic, bubble-gum-like, material while it was being stroked across the sample surface.

"Coagulation on Trowel" defined as the accumulation of solidified latex adhesive on the trowel during the stroking process. This may or may not have been coincident with the "Coagulation" phenomenon, which pertained only to the latex adhesive that resided on the surface of the panel sample.

"Color Transfer from Coating onto Trowel" defined as the accumulation of abraded basal strata coating on the trowel during the stroking process.

"Premature Curing" defined as the act of solidification, hardening or the loss of tack of the vinyl adhesive during the first 10 minutes subsequent to application. An examination of the interface between the applied adhesive and the board surface was conducted in order to determine whether or not the applied adhesive was prematurely solidifying at that location.

None of the adhesives demonstrated any incompatibilities with the fully coated underlayment panels based on these criteria. Uncoated underlayment panels were also tested. The Henry's 270 and 356 demonstrated subtle coagulation and coagulation on the trowel at 144 strokes and 112 strokes, respectively, when they were tested on uncoated underlayment panels.

The test was also conducted on underlayment sections that were coated with just the basal strata formulation and not the supra strata formulation. Coagulation on the trowel was observed after 160 strokes with the Armstrong S235 and S670 adhesives. Color transfer was observed on all Armstrong and Henrys adhesives. Coagulation, coagulation on the trowel and bubble-gumming were observed at only 120 strokes with the Henry's adhesives. Coagulation, coagulation on the trowel and bubble-gumming were observed at only 112 strokes with the Tarket FB-1 adhesive. The other adhesives did not develop problems during the evaluation.

The adhesive compatibility test was also conducted on underlayment sections that were coated at a spread rate of 11 wet g/ft$^2$ with a formulation that contained magnesium hydroxide at a 30% level. The Armstrong S235 and S254 and Henry's 270 and 356 adhesives demonstrated coagulation, coagulation on the trowel, and premature curing after only about 32 strokes. The Congoleum 3044 adhesive showed coagulation on the trowel after 160 strokes. The Tarket FB-1 adhesive demonstrated coagulation, coagulation on the trowel, and premature curing after only about 32 strokes.

Figure 3:
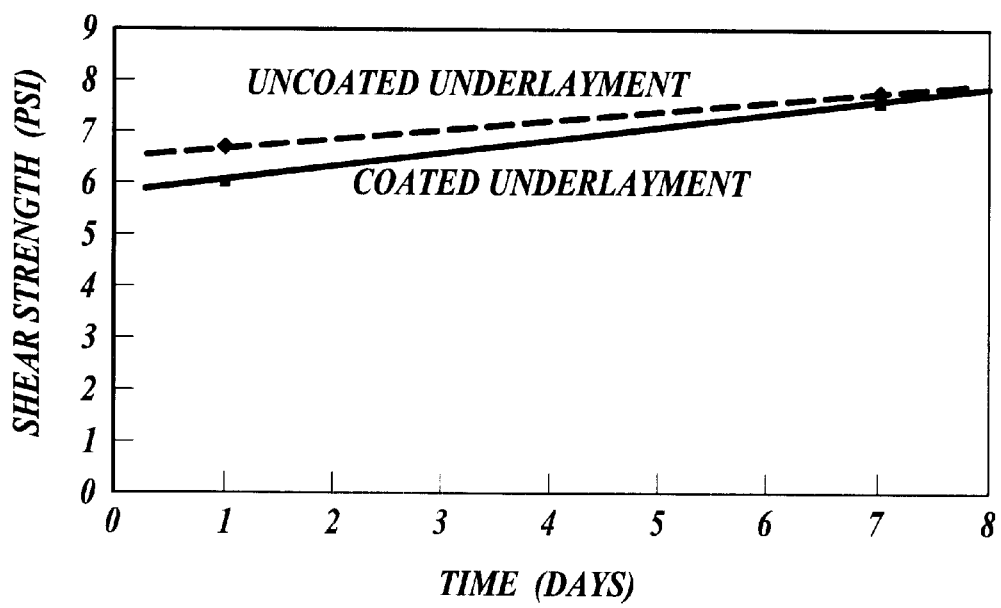
FIG. 3 is a graph comparing the development of latex adhesive bond strength for an uncoated underlayment and a coated underlayment formed in accordance with the present invention.

An adhesive bond strength test was also conducted on panels that were coated with both the basal and supra strata formulations as previously described in this example. Uncoated panels were also tested. Sections (6"×12") of a vinyl floor covering known as SUCCESSOR (produced by Armstrong World Industries of Lancaster, Pa.) were glued to both types of the underlayment by use of S670 adhesive from Armstrong. The samples were glued together according to the floor installation procedures specified by Armstrong. The adhesive was allowed to cure for either 1 or 7 days and the samples were then tested for shear strength. Ten replicate laminates were prepared and tested for each underlayment type and equilibration time. The test results are displayed in FIG. 3. The data generated indicate that the rate of strength development for the adhesive bond was effected very little by the coating system.

Figure 4:
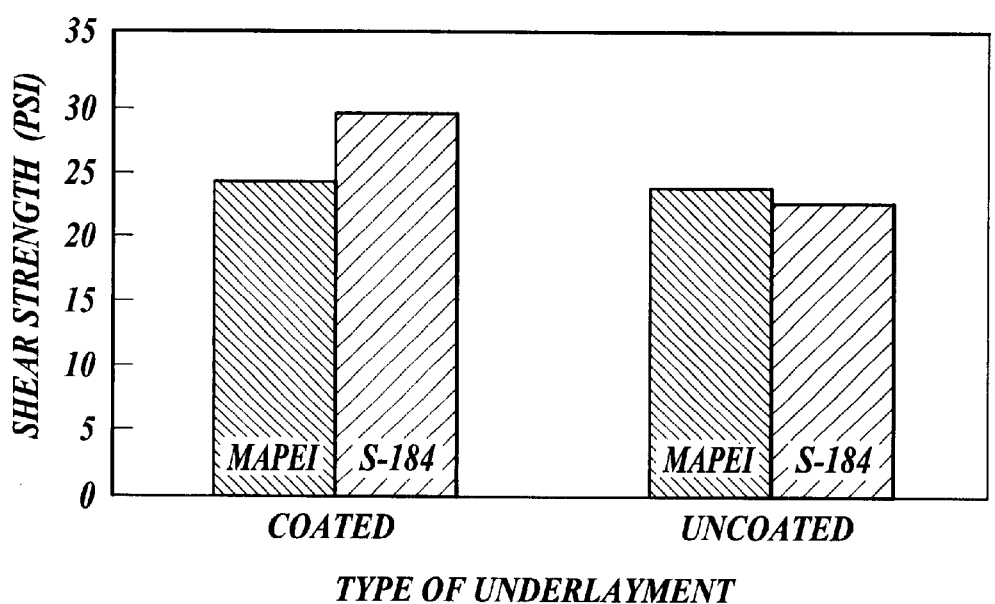
FIG. 4 is a graph comparing patching compound bond strength for uncoated underlayments and coated underlayments formed in accordance with the present invention.

Patching compound bond strength. A patching compound bond strength test was also conducted on OSB aspen underlayment panels that were coated with both the basal and supra strata formulations as previously described in this example. Uncoated panels were also tested. Sections (3"×12") of each underlayment type were treated on the top major surface with either the MAPEI PLANI/PATCH material from Mapei Inc. (Montreal, PQ, Canada) or the S-184 from Armstrong World Industries (Lancaster, Pa.). Both types of patching materials were applied at a level of 40 wet g/ft$^2$ and were allowed to dry for 60 minutes at a temperature of 20 C. Like samples were then glued together with the patched faces contacting each other. The adhesive used was Armstrong's S254 and the spread rate was 15–25 g/ft$^2$. Immediately after adhesive application the samples were mated with a contact pressure of only about 5 psi, which was maintained over a 24 h period. After 7 additional days of equilibration at a temperature of 20 C the laminates were tested for shear strength. Ten replicate laminates were prepared and tested for each underlayment and patching compound type. The results of these tests are displayed in FIG. 4. The data generated indicate that this coating system did not appear to significantly effect the bond strength between the underlayment and two typical patching compounds.

Stain Testing. Vinyl staining tests were conducted in which sections (6"×12") of vinyl floor covering were stapled to sections (6"×12") of coated and uncoated pine OSB underlayment. The coating system was comprised of both the basal and supra strata formulations as previously described in this example. The assemblies were then placed in an environmental chamber for a period of eight weeks with the relative humidity maintained at 90% and the temperature maintained at 50° C. The vinyl sections in the assemblies were inspected for stain formation at one week intervals. Replicates of 20 were used for all tests and the vinyl sections in each assembly were assigned a value during each evaluation period that represented the degree of staining associated with it. Types of vinyl floor covering evaluated included SUCCESSOR perimeter attached and CAMBRAY fully adhered from Armstrong World Industries (Lancaster, Pa.); OMNI perimeter attached, ARGENT perimeter attached and VEGA II fully adhered from Mannington (Salem, N.J.); HIGHLIGHT perimeter attached from the Congoleum Corporation (Mercerville, N.J.); and BRIGHT IMAGE fully adhered from Tarkett Incorporated (Whitehall, Pa.).

After 8 weeks of conditioning the vinyl floor covering sections that were placed in contact with uncoated underlayment sections were generally substantially stained on the side of the vinyl that contacted the wood. The opposite side of the vinyl, which did not directly contact the wood, was stained to a lesser degree. In many cases these stains appeared to mirror specific strands in the OSB underlayment.

No stains were observed on the topside of the vinyl floor covering that was attached to the coated underlayment. Only minimal staining was observed on the side of the vinyl floor covering that contacted the coated OSB underlayment.

EXAMPLE 2

The Preparations of Representative Basal and Supra Strata Formulations and Coatings Prepared Therefrom In this example, the preparation and characteristics of representative basal and supra strata formulations are described. Coatings prepared from these formulations and their ability to inhibit stain formation in overlaying vinyl floor coverings is also described. For these representative coatings, the copper amino complex was a copper morpholine complex.

Basal stratum formulation. A basal stratum formulation that exhibits excellent shelf-life during storage; has a set of rheological properties that are appropriate for application to an OSB underlayment panel with a reverse-roll-filling-machine; dramatically inhibits a pine-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives, patching compounds and metallic fasteners was prepared according to the following procedure.

A 1-liter Waring blender was charged with water (250.0 parts by weight) and RCN-30 Avicel (16.0 parts by weight), a blend of xanthan gum and microcrystalline cellulose produced by FMC Corporation (Philadelphia, Pa.), and the mixture was stirred for 2 minutes at the highest rate of shear. Pigment dispersions from the Sun Chemical Corporation (Amelia, Ohio), known as Sunsperse YHD-6005 diarylide yellow dispersion (5.0 parts by weight), Sunsperse BHD-6000 phthalo blue dispersion (0.3 parts by weight), and Sunsperse LHD-9303 carbon black dispersion (0.4 parts by weight) were added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (35.0 parts by weight) from Shepherd Chemical Company (Cincinnati, Ohio) was added to the blender and the mixture was stirred for at least 60 s. Cab-O-Sil EH-5 (10.0 parts by weight), which is a porous, precipitated silica powder from Cabot Corporation (Tuscola, Ill.) was added to the blender and the mixture was stirred for at least 60 s. Morpholine (35.0 parts by weight) was added to the blender and the mixture was stirred for at least 60 s. Titanium dioxide powder (50.0 parts by weight), known as Tronox CR-822, which was produced by Kerr-McGee (Oklahoma City, Okla.), was added to the blender and the mixture was stirred for at least 60 s. Superfine melamine powder (90.0 parts by weight), which was produced by Melamine Chemicals Inc. (Donaldson, La.), was added to the blender and the mixture was stirred for at least 120 s. A calcium carbonate powder (93.3 parts by weight) was added to the blender and the mixture was stirred for at least 60 s. Cab-O-Sil EH-5 (15.0 parts by weight), which is a porous, precipitated silica powder from Cabot Corporation (Tuscola, Ill.) was added to the blender and the mixture was stirred for at least 60 s.

Supra stratum formulation. A supra stratum formulation that has excellent shelf life during storage; has rheology and surface tension properties that are appropriate for application to an underlayment panel by use of a curtain-coating machine; and provides a coated underlayment surface that is highly compatible with the typical aqueous latex adhesives that are used to adhere vinyl floor coverings to wooden underlayment panels was prepared according to the following procedure.

A 1-liter Waring blender was charged with water (230.0 parts by weight) and RCN-30 Avicel (16.0 parts by weight), a blend of xanthan gum and microcrystalline cellulose produced by FMC Corporation (Philadelphia, Pa.), and the mixture was stirred for 2 minutes at the highest rate of shear.

A fine calcium carbonate powder, known as OMYACARB 3 (304.0 parts by weight) produced by Omya Inc. (Proctor, Vt.), was added to the blender and the mixture was stirred for an additional 60 s. A non-ionic, carboxylated SBR latex (450.0 parts by weight), known as Tylac 97422-21 from Reichhold Chemicals Inc. (Dover, Del.), was added to the blender and the contents were stirred for at least 90 s.

Basal and supra strata formulation coating. OSB panel sections (¼"×6"×12"; 40 count) comprised primarily of pine strands were randomized and then divided into 2 groups of 20 sections each. All of the sections in one of these groups were coated on the top surface with the basal stratum formulation described in this example by use of a roll coater at a spread rate of 6 g/ft$^2$. The supra stratum formulation described in this example was then sprayed on top of the basal strata at a spread rate of 6 g/ft$^2$. The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), SUCCESSOR from Armstrong World Industries (Lancaster, Pa.), were stapled to the coated side of the coated OSB samples. Other floor sheathing sections were also attached to one side of the uncoated OSB samples. The staples were inserted into just one side of the laminate so that the floor sheathing could be inspected on the backside by simply rolling it back on the nonstapled sides. The floor sheathing/OSB laminate samples were then conditioned in an environmental chamber at a temperature of 50° C. and a relative humidity value of 90% for an 8 week period. The samples were removed at weekly intervals and evaluated for stain formation. During these evaluations the topside of each floor sheathing section was inspected for stains. The backside of the floor sheathing, which was in direct contact with either the OSB or the coating on the OSB, was also examined and assigned a rating based on the degree of discoloration. Floor sheathing samples with no discoloration on their back-side were assigned a perfect rating of 1.0. Floor sheathing samples with the most severe degree of discoloration on their backside were given a rating of 6.0. Six standard samples with different degrees of back-side stain formation, which ranged from mild discoloration to severe, were used as a reference by the person who was conducting the evaluation. An average degree of backside stain formation was calculated based on the twenty samples in each group. These numbers were then converted to a percentage of stain severity. A vinyl with a perfect 1.0 stain rating had 0% staining, while a vinyl with the most severe stain rating of 6.0 had 100% staining. Over 10,000 samples have been analyzed by this method and it has been found that this test can yield reproducible results that can be used to successfully predict the rate of stain formation in the field. The results of this evaluation are displayed in Tables 3 and 4. The samples were conditioned at 50° C. at 90 percent relative humidity. In the tables, 0%=no backside staining; 100%=most severe back-side discoloration. Stains were yellow in color. The 400 ft$^2$ area represents the approximate surface area of vinyl floor sheathing used in many homes.

TABLE 3

Backside Vinyl Staining Expressed as a Percentage of the Most Intense Backside Stain Possible

| Time (days) | Coated OSB | Uncoated OSB |
|---|---|---|
| 0 | 0 | 0 |
| 7 | 0 | 6 |
| 14 | 2 | 14 |
| 21 | 4 | 20 |
| 28 | 6 | 26 |
| 35 | 6 | 26 |
| 42 | 8 | 30 |
| 49 | 14 | 38 |
| 56 | 16 | 48 |

TABLE 4

Number of Topside Stains Per 400 ft$^2$

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 0 |
| 35 | 0 | 0 |
| 42 | 0 | 0 |
| 49 | 0 | 80 |
| 56 | 0 | 160 |

Although the discoloration on the backside of the floor sheathing is not generally viewed by a homeowner, there appears to be a relationship between the rate of backside stain formation in vinyl-backed floor sheathing and the rate of topside stain formation. This relationship is complex, but in general the incidence of topside stain formation for vinyl-backed floor sheathing at a given point in time is proportional to the numerical summation of the product of the backside stain formation and contact time squared. Thus, an assessment of backside stain formation can be used to predict topside;stain formation in vinyl-backed floor sheathing. Use of this relationship greatly reduces test cycle time.

Metal Fastener Corrosion. Samples of coated and uncoated OSB underlayment that were similar to those described in this example were also tested for their propensity to corrode metal fasteners. In this test metal staples, which are commonly used in the field to attach the underlayment to the subfloor were obtained. The staples were washed with acetone prior to testing in order to remove any protective oils. A total of 120 washed staples were partitioned into six groups of 20. Three coated OSB underlayment samples (12"×12") and three uncoated OSB underlayment samples (12"×12") were obtained. The initial mass of each set of washed staples was measured and recorded. Each set of washed staples was then placed in intimate contact with the top surface of each underlayment sample in an environmental chamber which was conditioned to 50° C. and 90% relative humidity for a period of 8 days. The staples were then separated from the underlayment samples and measured for mass. The percentage of mass lost was then calculated and is shown in Table 5.

19

TABLE 5

Percentage of Staple Mass Lost after Equilibration
with OSB Underlayment

| Coated OSB | Uncoated OSB |
|---|---|
| 0.1% | 0.2% |

The results indicate that percent loss of staple mass was twice as greater for the uncoated underlayment compared to the coated underlayment of the invention.

EXAMPLE 3

The Preparation of Representative Basal and Supra Strata Formulations and Coatings Prepared Therefrom In this example, the preparation and characteristics of representation basal and supra strata formulations are described. Coatings prepared from these formulations and their ability to inhibit stain formation in overlaying vinyl floor coverings is also described. For these representative coatings, the copper amino complex was a copper morpholine complex.

Basal stratum formulation. A basal stratum formulation that exhibits excellent shelf-life during storage; has a set of rheological properties that are appropriate for application to an OSB underlayment panel with a reverse-roll-filling-machine; dramatically inhibits either a pine-based or an aspen-based OSB panel from staining vinyl floor covering under conditions of elevated temperatures and high relative humidity values; and forms a coating layer that can be covered with the aforementioned supra strata to yield a two strata coating that is perfectly compatible with vinyl adhesives and patching compounds was prepared according to the following procedure.

A 1-liter Waring blender was charged with water (218.3 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from the Sun Chemical Corporation (Amelia, Ohio), known as Sunsperse YHD-6005 diarylide yellow dispersion (3.645 parts by weight), Sunsperse BHD-6000 phthalo blue dispersion (0.146 parts by weight), and Sunsperse LHD-9303 carbon black dispersion (0.109 parts by weight) were added to the blender and the mixture was stirred for at least 60 s. An ethoxylated nonylphenol surfactant from Rhodia, Inc. (Cranbury, N.J.), known as IGEPAL CO-630 (3.0 parts by weight), was added to the blender and the mixture was stirred for 30 s. Titanium dioxide powder (160.0 parts by weight), known as Tronox CR-822, which was produced by Kerr-McGee (Oklahoma City, Okla.), was added to the blender and the mixture was stirred for at least 60 s. A non-ionic, carboxylated SBR latex (385.0 parts by weight), known as Tylac 97422-00 from Reichhold Chemicals Inc. (Dover, Del.), was then added to the blender and the contents were stirred for at least 30 s. Hydrated copper (II) nitrate (90.0 parts by weight) from Shepherd Chemical Company (Cincinnati, Ohio) was added to the blender and the mixture was stirred for at least 60 s. Cab-O-Sil EH-5 (4.0 parts by weight), which is a porous, precipitated powder from Cabot Corporation (Tuscola, Ill.) was added to the blender and the mixture was stirred for at least 60 s. Morpholine (90.0 parts by weight) was added to the blender and the mixture was stirred for at least 60 s. Superfine melamine powder (23.3 parts by weight), which was produced by Melamine Chemicals Inc. (Donaldson, La.), was added to the blender and the mixture was stirred for at least 120 s. Cab-0-Sil EH-5 (7.5 parts by weight), which is a porous, precipitated powder from Cabot Corporation (Tuscola, Ill.) was added to the blender and the mixture was stirred for at least 60 s.

The basal stratum formulation was particularly suitable for application to the top major surface of an OSB underlayment panel by use of a reverse roll-filling machine such as that manufactured by Black Brothers Co. (Mendota, Ill.). This machine was used to apply the basal stratum formulation to the top major surface of OSB underlayment panels with dimensions of ¼"×4'×8' at a spread rate of 3–4 wet g/ft$^2$. The basal stratum coating was at least partially dried and then the supra stratum formulation, prepared as described in Example 1, was applied on top of the basal stratum at a spread rate of 6 wet g/ft$^2$. The coated panel was then dried. The resulting coated underlayment panel had virtually perfect adhesive and patching compound compatibility properties. The staining potential of the coated panel was found to be dramatically less than that of the corresponding uncoated panel.

EXAMPLE 4

The Preparation of Representative Basal Stratum Formulations Having Variable Copper:Amine Molar Ratios In this example, basal stratum formulations having variable copper:amine (morpholine) molar ratios are described. The ability of coatings prepared from these formulations in inhibiting stain formation in overlaying vinyl coverings is also described.

Basal stratum formulations that exhibit excellent shelf-life during storage; have rheological properties that are appropriate for application to an OSB underlayment panel with a reverse-roll-filling-machine; dramatically inhibit a pine-based or an aspen-based OSB panel from staining a vinyl floor covering under conditions of elevated temperatures and high relative humidity values; and forms a coating layer that can be covered with the aforementioned supra stratum to yield a two strata coating that is highly compatible with vinyl adhesives and patching compounds were prepared according to the following procedures.

Basal stratum formulation having 1:2 molar ratio of copper:morpholine. A 1-liter Waring blender was charged with water (250.0 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from the Sun Chemical Corporation (Amelia, Ohio), known as Sunsperse YHD-6005 diarylide yellow dispersion (5.0 parts by weight), Sunsperse BHD-6000 phthalo blue dispersion (0.3 parts by weight), and the Sunsperse LHD-9303 carbon black dispersion (0.4 parts by weight) were added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (80.6 parts by weight) from Shepherd Chemical Company (Cincinnati, Ohio) was added to the blender and the mixture was stirred for at least 60 s. Cab-0-Sil EH-5 (6.0 parts by weight), which is a porous, precipitated silica powder from the Cabot Corporation (Tuscola, Ill.) was added to the blender and the mixture was stirred for at least 60 s. Morpholine (59.4 parts by weight) was added to the blender and the mixture was stirred for at least 60 s. Titanium dioxide powder (150.0 parts by weight), known as Tronox CR-822, which was produced by Kerr-McGee (Oklahoma City, Okla.), was added to the blender and the mixture was stirred for at least 60 s. Superfine melamine powder (33.3 parts by weight), which was produced by Melamine Chemicals Inc. (Donaldson, La.), was added to the blender and the mixture was stirred for at least 120 s.

Basal stratum formulation having 3:4 molar ratio of copper:morpholine. A 1-liter Waring blender was charged with water (250.0 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005. diarylide yellow dispersion (5.0 parts by weight), Sunsperse BHD-6000 phthalo blue dispersion (0.3 parts by weight), and Sunsperse LHD-9303 carbon black dispersion (0.4 parts by weight) were added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (93.9 parts by weight) from Shepherd Chemical Company (Cincinnati, Ohio) was added to the blender and the mixture was stirred for at least 60 s. Cab-O-Sil EH-5 (6.0 parts by weight), which is a porous, precipitated silica powder from Cabot Corporation (Tuscola, Ill.) was added to the blender and the mixture was stirred for at least 60 s. Morpholine (46.1 parts by weight) was added to the blender and the mixture was stirred for at least 60 s. Titanium dioxide powder (150.0 parts by weight), known as Tronox CR-822, which was produced by Kerr-McGee (Oklahoma City, Okla.), was added to the blender and the mixture was stirred for at least 60 s. Superfine melamine powder (33.3 parts by weight), which was produced by Melamine Chemicals Inc. (Donaldson, La.), was added to the blender and the mixture was stirred for at least 120 s.

Basal stratum formulation having 1:4 molar ratio of copper:morpholine. A 1-liter Waring blender was charged with water (250.0 parts by weight) and RCN-30 Avicel (15.0 parts by weight), a blend of xanthan gum and microcrystalline cellulose produced by FMC Corporation (Philadelphia, Pa.) and the mixture was stirred for 2 minutes at the highest rate of shear. Pigment dispersions from Sun Chemical Corporation (Amelia, Ohio), known as Sunsperse YHD-6005 diarylide yellow dispersion (5.0 parts by weight), Sunsperse BHD-6000 phthalo blue dispersion (0.3 parts by weight), and Sunsperse LHD-9303 carbon black dispersion (0.4 parts by weight) were added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (56.6 parts by weight) from Shepherd Chemical Company (Cincinnati, Ohio) was added to the blender and the mixture was stirred for at least 60 s. Cab-O-Sil EH-5 (6.0 parts by weight), which is a porous, precipitated silica powder from Cabot Corporation (Tuscola, Ill.) was added to the blender and the mixture was stirred for at least 60 s. Morpholine (83.4 parts by weight) was added to the blender and the mixture was stirred for at least 60 s. Titanium dioxide powder (150.0 parts by weight), known as Tronox CR-822, which was produced by Kerr-McGee (Oklahoma City, Okla.), was added to the blender and the mixture was stirred for at least 60 s. Superfine melamine powder (33.3 parts by weight), which was produced by Melamine Chemicals Inc. (Donaldson, La.), was added to the blender and the mixture was stirred for at least 120 s.

Panel coating. OSB panel sections (¼"×6"×12"; 40 count) comprised primarily of aspen, maple and pine strands were randomized and then divided into 4 groups of 10 sections each. One of the groups was coated on the top surface with the 3:4 copper:morpholine molar ratio basal stratum formulation described in this example by use of a roll coater at a spread rate of 3 g/ft$^2$. A second group was coated on the top surface with the 1:2 copper:morpholine molar ratio basal stratum formulation described in this example by use of a roll coater at a spread rate of 3 g/f$^2$. A third group was coated on the top surface with the 1:4 copper:morpholine molar ratio basal stratum formulation described in this example by use of a roll coater at a spread rate of 3 g/ft$^2$. The supra stratum formulation described in Example 1 was then sprayed on top of the basal stratum at a spread rate of 6 g/ft$^2$ for all samples in these first three groups. The coated samples were dried in a forced air oven at a temperature of 100° C. for 3 minutes. The fourth group of OSB underlayment was not coated.

Stain testing. The panel samples were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples. These laminates were subjected to the same staining test described in Example 2 with the exception that the test was conducted for a 35 day period. The results are shown in Tables 6 and 7. The samples were conditioned at 50° C. at 90 percent relative humidity. In the tables, 0%=backside staining; 100%=most severe backside discoloration. Stains were yellow in color. The 400 ft$^a$ area represents the approximate surface area of vinyl floor sheathing used in many homes. This type of OSB had a stronger staining action on the floor sheathing than did the OSB described in Example 2.

TABLE 6

Backside Vinyl Staining Expressed as a Percentage of the Most Intense Backside Stain Possible

| Time (days) | 1:4 copper:morpholine molar ratio basal stratum | 1:2 copper:morpholine molar ratio basal stratum | 3:4 copper:morpholine molar ratio basal stratum | Uncoated OSB |
|---|---|---|---|---|
| 0 | 0 | 0 | 0 | 0 |
| 3 | 4 | 4 | 6 | 62 |

TABLE 6-continued

Backside Vinyl Staining Expressed as a Percentage of the Most Intense Backside Stain Possible

| Time (days) | 1:4 copper:morpholine molar ratio basal stratum | 1:2 copper:morpholine molar ratio basal stratum | 3:4 copper:morpholine molar ratio basal stratum | Uncoated OSB |
|---|---|---|---|---|
| 7 | 16 | 14 | 12 | 64 |
| 16 | 18 | 14 | 14 | 74 |
| 35 | 26 | 24 | 22 | 82 |

TABLE 7

Number of Topside Stains Per 400 ft$^2$

| Time (days) | 1:4 copper:morpholine molar ratio basal stratum | 1:2 copper:morpholine molar ratio basal stratum | 3:4 copper:morpholine molar ratio basal stratum | Uncoated OSB |
|---|---|---|---|---|
| 0 | 0 | 0 | 0 | 0 |
| 3 | 0 | 0 | 0 | 80 |
| 7 | 0 | 0 | 0 | 80 |
| 16 | 0 | 0 | 0 | 240 |
| 35 | 160 | 0 | 80 | 240 |

The results indicate that all of the copper:morpholine complexes were effective in significantly reducing staining in coated panels compared to uncoated OSB panels.

EXAMPLE 5

The Preparation of a Representative Basal Stratum Formulation Including Copper Triethanolamine Complex and Coating Prepared Therefrom In this example, the preparation of a basal stratum formulation including a copper triethanolamine complex is described. The ability of a representative coating formed from this formulation in inhibiting stain formation in overlaying vinyl floor coverings is also described.

Basal stratum formulation. A basal stratum formulation that inhibits an aspen-based OSB panel from staining a vinyl floor covering under conditions of elevated temperatures and high relative humidity values; and forms a coating layer that can be covered with the aforementioned supra stratum to yield two strata coating that is highly compatible with vinyl adhesives and patching compounds was prepared according to the following procedure.

A 1-liter Waring blender was charged with water (209.4 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (7.50 parts by weight), Sunsperse BHD-6000 phthalo blue dispersion (0.50 parts by weight), and Sunsperse LHD-9303 carbon black dispersion (0.60 parts by weight) were added to the blender and the mixture was stirred for at least 60 s. Titanium dioxide powder (190.0 parts by weight), known as Tronox CR-822, which was produced by Kerr-McGee (Oklahoma City, Okla.), was added to the blender and the mixture was stirred for at least 60 s. An antimony trioxide powder (15.0 parts by weight) was added to the blender and the mixture was stirred for about 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (71.6 parts by weight) from Shepherd Chemical Company (Cincinnati, Ohio) was added to the blender and the mixture was stirred for at least 60 s. Cab-0-Sil EH-5 (2.0 parts by weight), which is a porous, precipitated silica powder from Cabot Corporation (Tuscola, Ill.) was added to the blender and the mixture was stirred for at least 60 s. Triethanolamine (88.4 parts by weight) was added to the blender and the mixture was stirred for at least 60 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this example by use of a roll coater at a spread rate of 3 g/ft$^2$. The supra stratum formulation described in Example 1 was then sprayed on top of the basal stratum at a spread rate of 6 g/ft$^2$. The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in Example 2 with the exception that the test was only conducted for a 1 week period. The results are shown in Table 8. The samples were conditioned at 50° C. at 90 percent relative humidity. In the tables, 0%=backside staining; 100%=most severe backside discoloration. Stains were yellow in color. The 400 ft$^a$ area represents the approximate surface area of vinyl floor sheathing used in many homes.

TABLE 8

Backside Vinyl Staining Expressed as a Percentage of the
Most Intense Backside Stain

| Time (days) | Coated OSB | Uncoated OSB |
| --- | --- | --- |
| 0 | 0 | 0 |
| 7 | 38 | 60 |

The results demonstrate that the coating containing the copper:triethanolamine complex is effective in significantly inhibiting stain formation in vinyl floor covering.

EXAMPLE 6

The Preparation of a Representative Basal Stratum Formulation Including Copper Diethanolamine Complex and Coating Prepared Therefrom In this example, the preparation of a basal stratum formulation including a copper diethanolamine complex is described. The ability of a representative coating prepared from this formulation in inhibiting stain formation in overlaying vinyl floor coverings is also described.

Basal stratum formulation stratum. A basal stratum formulation that inhibits an aspen-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (209.4 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (7.50 parts by weight), Sunsperse BHD-6000 phthalo blue dispersion (0.50 parts by weight), and Sunsperse LHD-9303 carbon black dispersion (0.60 parts by weight) were added to the blender and the mixture was stirred for at least 60 s. Titanium dioxide powder (190.0 parts by weight), known as Tronox CR-822, which was produced by Kerr-McGee (Oklahoma City, Okla.), was added to the blender and the mixture was stirred for at least 60 s. An antimony trioxide powder (15.0 parts by weight) was added to the blender and the mixture was stirred for about 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (85.6 parts by weight) from Shepherd Chemical Company (Cincinnati, Ohio) was added to the blender and the mixture was stirred for at least 60 s. Cab-O-Sil EH-5 (2.0 parts by weight), which is a porous, precipitated silica powder from Cabot Corporation (Tuscola, Ill.) was added to the blender and the mixture was stirred for at least 60 s. Diethanolamine (74.4 parts by weight) was added to the blender and the mixture was stirred for at least 60 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this example by use of a roll coater at a spread rate of 3 g/ft². The supra stratum formulation described in Example 1 was then sprayed on top of the basal stratum at a spread rate of 6 g/ft². The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in Example 2 with the exception that the test was only conducted for a 1 week period. The results are shown in Table 9. The samples were conditioned at 50° C. at 90 percent relative humidity. In the tables, 0%=backside staining; 100%=most severe backside discoloration. Stains were yellow in color. The 400 ft² area represents the approximate surface area of vinyl floor sheathing used in many homes.

TABLE 9

Backside Vinyl Staining Expressed as a Percentage of the
Most Intense Backside Stain

| Time (days) | Coated OSB | Uncoated OSB |
| --- | --- | --- |
| 0 | 0 | 0 |
| 7 | 26 | 60 |

The results demonstrate that the coating containing the copper:diethanolamine complex is effective in significantly inhibiting stain formation in vinyl floor covering.

EXAMPLE 7

The Preparation of a Representative Basal Stratum Formulation Including Copper Ethanolamine Complex and Coating Prepared Therefrom In this example, the preparation of a basal stratum formulation including a copper ethanolamine complex is described. The ability of a representative coating formed from this formulation in inhibiting stain formation in overlaying vinyl floor coverings is also described.

Basal stratum formulation stratum. A basal stratum formulation that inhibits an aspen-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (209.4 parts by weight) and RCN-30 Avicel (15.0 parts by weight), a blend of xanthan gum and microcrystalline cellulose produced by FMC Corporation Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (7.50 parts by weight), Sunsperse BHD-6000 phthalo blue dispersion (0.50 parts by weight), and Sunsperse LHD-9303 carbon black dispersion (0.60 parts by weight) were added to the blender and the mixture was stirred for at least 60 s. Titanium dioxide powder (190.0 parts by weight), known as Tronox CR-822, which was produced by Kerr-McGee (Oklahoma City, Okla.), was added to the blender and the mixture was stirred for at least 60 s. An antimony trioxide powder (15.0 parts by weight) was added to the blender and the mixture was stirred for about 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (104.1 parts by weight) from Shepherd Chemical Company (Cincinnati, Ohio) was added to the blender and the mixture was stirred for at least 60 s. Cab-O-Sil EH-5 (2.0 parts by weight), which is a porous, precipitated silica powder from Cabot Corporation (Tuscola, Ill.) was added to the blender and the mixture was stirred for at least 60 s. Ethanolamine (55.9 parts by weight) was added to the blender and the mixture was stirred for at least 60 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this example by use of a roll coater at a spread rate of 3 g/ft². The supra stratum formulation described in Example 1 was then sprayed on top of the basal stratum at a spread rate of 6 g/ft². The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in example 2 with the exception that the test was only conducted for a 1 week period. The results are shown in Table 10. The samples were conditioned at 50° C. at 90 percent relative humidity. In the tables, 0%=backside staining; 100%=most severe backside discoloration. Stains were yellow in color. The 400 ft² area represents the approximate surface area of vinyl floor sheathing used in many homes.

TABLE 10

Backside Vinyl Staining Expressed as a Percentage of the Most Intense Backside Stain Possible

| Time (days) | Coated OSB | Uncoated OSB |
| --- | --- | --- |
| 0 | 0 | 0 |
| 7 | 26 | 60 |

The results demonstrate that the coating containing the copper:ethanolamine complex is effective in significantly inhibiting stain formation in vinyl floor covering.

EXAMPLE 8

The Preparation of a Representative Basal Stratum Formulation Including Copper Ammonia Complex and Coating Prepared Therefrom In this example, the preparation of a basal stratum formulation including a copper ammonia complex is described. The ability of a representative coating formed from this formulation in inhibiting stain formation in overlaying vinyl floor coverings is also described.

Basal stratum formulation stratum. A basal stratum formulation that inhibits an aspen-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (209.4 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (7.50 parts by weight), Sunsperse BHD-6000 phthalo blue dispersion (0.50 parts by weight), and Sunsperse LHD-9303 carbon black dispersion (0.60 parts by weight) were added to the blender and the mixture was stirred for at least 60 s. Titanium dioxide powder (190.0 parts by weight), known as Tronox CR-822, which was produced by Kerr-McGee (Oklahoma City, Okla.), was added to the blender and the mixture was stirred for at least 60 s. An antimony trioxide powder (15.0 parts by weight) was added to the blender and the mixture was stirred for about 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (108.9 parts by weight) from Shepherd Chemical Company (Cincinnati, Ohio) was added to the blender and the mixture was stirred for at least 60 s. Cab-O-Sil EH-5 (2.0 parts by weight), which is a porous, precipitated silica powder from Cabot Corporation of (Tuscola, Ill.) was added to the blender and the mixture was stirred for at least 60 s. A 30% ammonium hydroxide (aq) solution (51.1 parts by weight) was added to the blender and the mixture was stirred for at least 60 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this example by use of a roll coater at a spread rate of 3 g/ft². The supra stratum formulation described in Example 1 was then sprayed on top of the basal stratum at a spread rate of 6 g/ft². The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in Example 2 with the exception that the test was only conducted for a 1 week period. The results are shown in Table 11. The samples were conditioned at 50° C. at 90 percent relative humidity. In the tables, 0%=backside staining; 100%=most severe backside discoloration. Stains were yellow in color. The 400 ft² area represents the approximate surface area of vinyl floor sheathing used in many homes.

TABLE 11

Backside Vinyl Staining Expressed as a Percentage of the Most Intense Backside Stain Possible

| Time (days) | Coated OSB | Uncoated OSB |
| --- | --- | --- |
| 0 | 0 | 0 |
| 7 | 20 | 60 |

The results demonstrate that the coating containing the copper:ammonia complex is effective in significantly inhibiting stain formation in vinyl floor covering.

EXAMPLE 9

The Preparation of a Representative Basal Stratum Formulation Including Copper Dimethylamine Complex and Coating Prepared Therefrom In this example, the preparation of a basal stratum formulation including a copper dimethylamine complex is described. The ability of a representative coating formed from this formulation in inhibiting stain formation in overlaying vinyl floor coverings is also described.

Basal stratum formulation stratum. A basal stratum formulation that inhibits an aspen-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (209.4 parts by weight) and RCN-30 Avicel (15.0 parts by weight), a blend of xanthan gum and microcrystalline cellulose produced by FMC Corporation (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (7.50 parts by weight), Sunsperse BHD-6000 phthalo blue dispersion (0.50 parts by weight) and Sunsperse LHD-9303 carbon black dispersion (0.60 parts by weight) were added to the blender and the mixture was stirred for at least 60 s. Titanium dioxide powder (190.0 parts by weight), known as Tronox CR-822, which was produced by Kerr-McGee (Oklahoma City, Okla.), was added to the blender and the mixture was stirred for at least 60 s. An antimony trioxide powder (15.0 parts by weight) was added to the blender and the mixture was stirred for about 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (79.4 parts by weight) from Shepherd Chemical Company (Cincinnati, Ohio) was added to the blender and the mixture was stirred for at least 60 s. Cab-0-Sil EH-5 (2.0 parts by weight), which is a porous, precipitated silica powder from Cabot Corporation (Tuscola, Ill.) was added to the blender and the mixture was stirred for at least 60 s. A 40% dimethylamine aqueous solution (80.6 parts by weight) was added to the blender and the mixture was stirred for at least 60 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this example by use of a roll coater at a spread rate of 3 g/ft$^2$. The supra stratum formulation described in Example 1 was then sprayed on top of the basal stratum at a spread rate of 6 g/ft$^2$. The coated samples were dried in a forced air oven at a temperature of 100° C. for 3 minutes.

Stain coating. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in Example 2 with the exception that the test was only conducted for a 1 week period. The results are shown in Table 12. The samples were conditioned at 50° C. at 90 percent relative humidity. In the tables, 0%=backside staining; 100%=most severe backside discoloration. Stains were yellow in color. The 400 ft$^2$ area represents the approximate surface area of vinyl floor sheathing used in many homes.

TABLE 12

Backside Vinyl Staining Expressed as a Percentage of the Most Intense Backside Stain Possible

| Time (days) | Coated OSB | Uncoated OSB |
| --- | --- | --- |
| 0 | 0 | 0 |
| 7 | 24 | 60 |

The results demonstrate that the coating containing the copper:dimethylamine complex is effective in significantly inhibiting stain formation in vinyl floor covering.

EXAMPLE 10

The Preparation of a Representative Basal Stratum Formulation and Coating Prepared Therefrom Basal stratum formulation stratum. A basal stratum formulation that inhibits an aspen-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (256.0 parts by weight) and RCN-30 Avicel (15.0 parts by weight), a blend of xanthan gum and microcrystalline cellulose produced by FMC Corporation of (Philadelphia, Pa.), and the mixture was stirred for 2 minutes at the highest rate of shear. Pigment dispersions from Sun Chemical Corporation (Amelia, Ohio), known as Sunsperse YHD-6005 diarylide yellow dispersion (2.50 parts by weight), Sunsperse BHD-6000 phthalo blue dispersion (0.15 parts by weight), and Sunsperse LHD-9303 carbon black dispersion (0.20 parts by weight) were added to the blender and the mixture was stirred for at least 60 s. Titanium dioxide powder (150.0 parts by weight), known as Tronox CR-822, which was produced by Kerr-McGee (Oklahoma City, Okla.), was added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (80.6 parts by weight) from Shepherd Chemical Company (Cincinnati, Ohio) was added to the blender and the mixture was stirred for at least 60 s. Cab-O-Sil EH-5 (2.85 parts by weight), which is a porous, precipitated silica powder from Cabot Corporation (Tuscola, Ill.) was added to the blender and the mixture was stirred for at least 60 s. Morpholine (59.4 parts by weight) was added to the blender and the mixture was stirred for at least 60 s. Superfine melamine powder (33.3 parts by weight), which was produced by Melamine Chemicals Inc. (Donaldson, La.), was added to the blender and the mixture was stirred for at least 120 s.

Panel coating. OSB panel sections (¼"×6"×12"; 20 count) comprised primarily of aspen, maple and pine strands were randomized and then divided into 2 groups of 10 sections each. All of the sections in one of these groups were coated on the top surface with the basal stratum formulation described in this Example by use of a roll coater at a spread rate of 3 g/ft$^2$. The supra stratum formulation described in Example 1 was then sprayed on top of the basal stratum at a spread rate of 6 g/ft$^2$. The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of the coated OSB samples. Other floor sheathing sections were also attached to one side of the uncoated OSB samples.

These laminates were subjected to the same staining test described in Example 2 with the exception that the test was only conducted for a 1 week period. The results are shown in Table 13. The samples were conditioned at 50° C. at 90 percent relative humidity. In the tables, 0%=backside staining; 100%=most severe backside discoloration. Stains were yellow in color. The 400 ft$^2$ area represents the approximate surface area of vinyl floor sheathing used in many homes.

TABLE 13

Backside Vinyl Staining Expressed as a Percentage of the Most Intense Backside Stain Possible

| Time (days) | Coated OSB | Uncoated OSB |
| --- | --- | --- |
| 0 | 0 | 0 |
| 7 | 10 | 60 |

EXAMPLE 11

The Preparation of a Representative Basal Stratum Formulation and Coating Prepared Therefrom In this example, the effectiveness of a representative coating of the invention in inhibiting stain formation in a variety of commercial vinyl floor coverings is described.

Basal stratum formulation. A basal stratum formulation that inhibits a pine-based OSB panel from staining a vinyl floor covering under conditions of elevated temperatures and high relative humidity values; and forms a coating layer that can be covered with the aforementioned supra stratum to yield a two strata coating that is perfectly compatible with vinyl adhesives and patching compounds was prepared according to the following procedure.

A 1-liter Waring blender was charged with water (250.0 parts by weight) and RCN-30 Avicel (14.0 parts by weight), a blend of xanthan gum and microcrystalline cellulose produced by FMC Corporation of (Philadelphia, Pa.) and the mixture was stirred for 2 minutes at the highest rate of shear. Pigment dispersions from Sun Chemical Corporation (Amelia, Ohio), known as Sunsperse YHD-6005 diarylide yellow dispersion (10.0 parts by weight), Sunsperse BHD-6000 phthalo blue dispersion (0.60 parts by weight), and Sunsperse LHD-9303 carbon black dispersion (0.80 parts by weight) were added to the blender and the mixture was stirred for at least 60 s. Titanium dioxide powder (50.0 parts by weight), known as Tronox CR-822, which was produced by Kerr-McGee (Oklahoma City, Okla.), was added to the blender and the mixture was stirred for at least 60 s. A non-ionic, carboxylated SBR latex (400.0 parts by weight), known as Tylac 97422-20 from Reichhold Chemicals Inc. (Dover, Del.), was then added to the blender and the contents were stirred for at least 30 s. Copper (II) nitrate trihydrate (70.0 parts by weight) from Shepherd Chemical Company (Cincinnati, Ohio) was added to the blender and the mixture was stirred for at least 60 s. Morpholine (70.0 parts by weight) was added to the blender and the mixture was stirred for at least 60 s. Superfine melamine powder (70.0 parts by weight), which was produced by Melamine Chemicals Inc. (Donaldson, La.), was added to the blender and the mixture was stirred for at least 120 s. Calcium carbonate powder (58.9 parts by weight) was added to the blender and the mixture was stirred for 60 s.

Panel coating. OSB panel sections (¼"×6"×12"; 120 count) comprised primarily of pine strands were randomized and then divided into 6 groups of 20 sections each. All of the sections in five of these groups were coated on the top surface with the basal stratum formulation described in this example by use of a roll coater at a spread rate of 3 g/ft$^2$. The supra stratum formulation described in Example 1 was then sprayed on top of the basal stratum at a spread rate of 6 g/ft$^2$. The coated samples were dried in a forced air oven at a temperature of 100° C. for 3 minutes.

Stain testing. The coated and uncoated panels were then subjected to an accelerated floor sheathing staining test. Sections of vinyl-backed floor sheathing (6"×12"), known as SUCCESSOR from Armstrong World Industries (Lancaster, Pa.), were stapled to the coated side of 20 of the coated OSB samples. Sections of felt-backed floor sheathing (6"×12"), known as INITIATOR from Armstrong World Industries (Lancaster, Pa.), were stapled to the coated side of 20 of the coated OSB samples. Sections of a fully-adhered, vinyl floor sheathing (6"×12"), known as SILVERADO BLUEBELL from Mannington (Salem, N.J.), were stapled to the coated side of 20 of the coated sections. Sections of a felt-backed, vinyl floor sheathing (6"12"), known as VEGA II from Mannington (Salem, N.J.), were stapled to the coated side of 20 of the coated sections. Sections of vinyl-backed floor sheathing (6"×12"), known as HIGHLIGHT from Congoleum Corporation (Mercerville, N.J.), were stapled to the coated side of 20 of the coated OSB samples. Other floor sheathing sections were also attached to one side of the 20 uncoated OSB samples.

These laminates were subjected to the same staining test described in Example 2 with the exception that the test was only conducted for a 16-week period. The results are shown in Tables 14–22. The samples were conditioned at 50° C. at 90 percent relative humidity. In the tables, 0%=backside staining; 100%=most severe backside discoloration. Stains were yellow in color. The 400 ft$^2$ area represents the approximate surface area of vinyl floor sheathing used in many homes.

TABLE 14

Backside Mannington SILVERADO Vinyl Staining
Expressed as a Percentage of the Most Intense Backside Stain Possible

| Time (days) | Coated OSB | Uncoated OSB |
|---|---|---|
| 0 | 0 | 0 |
| 7 | 0 | 0 |
| 14 | 0 | 4 |
| 21 | 2 | 8 |
| 28 | 4 | 12 |
| 56 | 6 | 24 |
| 84 | 12 | 28 |
| 112 | 12 | 32 |

TABLE 15

Number of Topside Mannington SILVERADO Vinyl Stains

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 40 |
| 56 | 0 | 200 |
| 84 | 0 | 240 |
| 112 | 320 | 320 |

TABLE 16

Backside Armstrong SUCCESSOR Vinyl Staining
Expressed as a Percentage of the Most Intense Backside Stain Possible

| Time (days) | Coated OSB | Uncoated OSB |
|---|---|---|
| 0 | 0 | 0 |
| 7 | 0 | 6 |
| 14 | 4 | 14 |
| 21 | 6 | 22 |
| 28 | 10 | 26 |
| 56 | 14 | 44 |
| 84 | 16 | 56 |
| 112 | 22 | 66 |

TABLE 17

Number of Topside Armstrong SUCCESSOR Vinyl Stain Per 400 ft$^2$

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 200 |
| 56 | 0 | 200 |
| 84 | 0 | 200 |
| 112 | 0 | 680 |

TABLE 18

Number of Topside Armstrong INITIATOR Vinyl Stains Per 400 ft$^2$

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 0 |
| 56 | 0 | 160 |
| 84 | 0 | 160 |
| 112 | 0 | 440 |

TABLE 19

Backside Mannington VEGA II Vinyl Staining
Expressed as a Percentage of the Most Intense Backside Stain Possible

| Time (days) | Coated OSB | Uncoated OSB |
|---|---|---|
| 0 | 0 | 0 |
| 7 | 0 | 4 |
| 14 | 0 | 10 |
| 21 | 0 | 14 |
| 28 | 0 | 22 |
| 56 | 0 | 22 |
| 84 | 2 | 22 |
| 112 | 6 | 26 |

TABLE 20

Number of Topside Mannington VEGA 11 Vinyl Stains Per 400 ft$^2$

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 0 |
| 56 | 0 | 0 |
| 84 | 0 | 0 |
| 112 | 0 | 0 |

TABLE 21

Backside Congoleum HIGHLIGHT Vinyl Staining
Expressed as a Percentage of the Most Intense Backside Stain Possible

| Time (days) | Coated OSB | Uncoated OSB |
|---|---|---|
| 0 | 0 | 0 |
| 7 | 0 | 2 |
| 14 | 0 | 4 |
| 21 | 0 | 22 |
| 28 | 0 | 30 |
| 56 | 6 | 36 |
| 84 | 6 | 40 |
| 112 | 8 | 52 |

TABLE 22

Number of Topside Congoleum HIGHLIGHT Vinyl Stains Per 400 ft$^2$

| Time (days) | Coated OSB | Uncoated OSB |
|---|---|---|
| 0 | 0 | 0 |
| 7 | 0 | 0 |
| 14 | 0 | 0 |
| 21 | 0 | 0 |
| 28 | 0 | 0 |
| 56 | 0 | 0 |

TABLE 22-continued

Number of Topside Congoleum HIGHLIGHT Vinyl Stains Per 400 ft²

| Time (days) | Coated OSB | Uncoated OSB |
|---|---|---|
| 84 | 0 | 0 |
| 112 | 0 | 0 |

The results demonstrate that the coatings of the invention containing a copper:amine complex are effective in significantly inhibiting stain formation in a variety of commercial vinyl floor coverings.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A coating on a wood panel to inhibit stain formation in a floor covering overlaying said wood panel, said coating comprised of:
   (a) a first stratum applied to said wood panel, said first stratum comprised of a copper amine complex and a binder material; and
   (b) a second stratum applied to said first stratum, said second stratum comprised of nonionic latex and inert filler particles.

2. The coating of claim 1, wherein the first stratum is adjacent and coextensive with the panel.

3. The coating of claim 1, wherein the second stratum overlays and is coextensive with the first stratum.

4. The coating of claim 1, further comprising a stratum intermediate the first stratum and the panel.

5. The coating of claim 1, further comprising a stratum intermediate the first and second strata.

6. The coating of claim 4, wherein the intermediate stratum comprises a resin impregnated paper.

7. The coating of claim 5, wherein the intermediate stratum comprises a resin impregnated paper.

8. The coating of claim 1, wherein the floor covering comprises a vinyl floor covering.

9. The coating of claim 1, wherein the floor covering comprises a polyvinyl chloride-based floor covering.

10. The coating of claim 1, wherein the copper amine complex is present in the first stratum in an amount from about 5 to about 20 percent by weight based on the total weight of the stratum.

11. The coating of claim 1, wherein the copper amine complex comprises an amine selected from the group consisting of morpholine, triethanolamine, diethanolamine, ethanolamine, ammonia, dimethylamine, and m-phenylenediamine.

12. The coating of claim 1, wherein the copper amine complex has a copper to amine molar ratio in the range from about 1:1 to about 1:4.

13. The coating of claim 1, wherein the copper amine complex comprises copper morpholine.

14. The coating of claim 13, wherein the copper morpholine complex has a copper to morpholine molar ratio in the range from about 1:1.3 to about 1–4.

15. The coating of claim 13, wherein the copper morpholine complex is present in an amount from about 14 to about 18 percent by weight based on the total weight of the coating.

16. The coating of claim 1, wherein the binder material comprises an aqueous, nonionic latex.

17. The coating of claim 16, wherein the binder material is selected from the group consisting of an acrylic latex, a styrene-butadiene latex, and a polyvinyl acetate latex.

18. The coating of claim 1, wherein the binder material is present in the stratum in an amount from about 20 to about 80 percent by weight of the total stratum.

19. The coating of claim 1, wherein the binder material comprises a nonionic carboxylated styrene-butadiene latex.

20. The coating of claim 1, wherein the first stratum further comprises an additive selected from the group consisting of a surfactant, a viscosifying agent, a metal complexing agent, a colorant, and an opacifying agent.

21. The coating of claim 20, wherein the surfactant comprises a nonionic surfactant.

22. The coating of claim 20, wherein the metal complexing agent comprises melamine.

23. The coating of claim 1, wherein the inert filler particles are selected from the group consisting of calcium carbonate, calcium sulfate, and mixtures thereof.

24. A formulation comprising a copper amine complex and a binder material, wherein the copper amine complex is present in an amount from about 5 to about 20 percent by weight based on the total weight of the formulation, wherein the binder material is present in an amount from about 20 to about 80 percent by weight based on the total weight of the formulation, and wherein the copper amine complex comprises at least one of morpholine, triethanolamine, diethanolamine, ethanolamine, dimethylamine, and m-phenylenediamine.

25. The formulation of claim 24, wherein the formulation exhibits no settling in a 3-day shaker test.

26. The formulation of claim 24, wherein the formulation exhibits no phase separation over sixty days storage at 20° C.

27. The formulation of claim 24, wherein the formulation has an undisturbed gel strength value in the range from about 0.5 to about 2.0 lbf over sixty days storage at 20° C.

28. A method for inhibiting stain formation in a floor covering overlaying a wood panel, comprising:
   (a) applying a first formulation to a surface of the panel to provide a panel having a surface coated with the first formulation, wherein the first formulation comprises a copper amine complex and a binder material;
   (b) applying a second formulation to the panel's coated surface to provide a panel sequentially coated with the first and second formulations, wherein the second formulation comprises nonionic latex and inert filler particles; and
   (c) drying the sequentially coated panel to provide a coated panel product.

29. The method of claim 28, wherein the floor covering comprises a vinyl floor covering.

30. The coating of claim 28, wherein the floor covering comprises a polyvinyl chloride-based floor covering.

31. The method of claim 28, wherein the first formulation is applied to the panel at a wet spread rate of from about 1 to about 15 g/ft².

32. The method of claim 28, wherein the second formulation is applied to the panel at a wet spread rate of from about 2 to about 12 g/ft².

33. The method of claim 28, wherein the wood panel comprises oriented strandboard.

34. The method of claim 28, wherein applying a first formulation to a surface of the panel further comprises:
   (a) continuously loading wood panels onto a conveyor; and
   (b) conveying a panel to a first application device where the first formulation is applied to a panel surface to provide a panel coated with the first formulation.

35. The method of claim 34, wherein applying a second formulation to the panel's coated surface further comprises conveying the panel coated with the first formulation to a second application device, where the second formulation is applied to the panel's coated surface to provide a panel sequentially coated with the first and second formulations.

36. The method of claim 35, wherein the panel is conveyed through the first and second application devices at a linear line speed of from about 10 to about 150 feet per minute.

37. The method of claim 35, wherein the second application device comprises a curtain-coater.

38. The method of claim 35, wherein the second application device comprises a device selected from the group consisting of a spray booth, a slot-coater, and a roll-coating machine.

39. The method of claim 34, wherein drying the panel sequentially coated with the first and second formulations comprises conveying the panel through a drying device to remove water from the coated panel sufficient to render the applied formulations intractable.

40. The method of claim 34, wherein the first application device comprises a roll-coating machine.

41. The method of claim 34, wherein the first application device comprises a device selected from the group consisting of a slot-coater and a spray booth.

42. The method of claim 28, wherein the copper amine complex comprises an amine selected from the group consisting of morpholine, triethanolamine, diethanolamine, ethanolamine, ammonia, dimethylamine, and m-phenylenediamine.

43. The method of claim 28, wherein the copper amine complex comprises copper morpholine.

44. A wood-based panel comprising a wood member having a surface coated with a coating for inhibiting stain formation in a floor covering, the coating intermediate the panel and the floor covering, wherein the coating comprises:
   (a) a first stratum comprising a copper amine complex and a binder material; and
   (b) a second stratum comprising nonionic latex and inert filler particles, and wherein the first stratum is intermediate the wood panel and the second stratum.

45. The panel of claim 44, wherein the copper amine complex is present in the first stratum in an amount from about 5 to about 20 percent by weight based on the total weight of the stratum.

46. The panel of claim 44, wherein the copper amine complex comprises an amine selected from the group consisting of morpholine, triethanolamine, diethanolamine, ethanolamine, ammonia, dimethylamine, and m-phenylenediamine.

47. The panel of claim 44, wherein the wood-based panel comprises oriented strandboard.

48. A floor assembly comprising a floor covering adhered to a wood-based panel, the panel comprising a wood member having a surface coated with a coating for inhibiting stain formation in a vinyl floor covering, wherein the coating is intermediate the panel and the floor covering, and wherein the coating comprises:
   (a) a first stratum comprising a copper amine complex and a binder material; and
   (b) a second stratum comprising nonionic latex and inert filler particles, and wherein the first stratum is intermediate the wood panel and the second stratum.

49. The assembly of claim 48, wherein the copper amine complex is present in the first stratum in an amount from about 5 to about 20 percent by weight based on the total weight of the stratum.

50. The assembly of claim 48, wherein the copper amine complex comprises an amine selected from the group consisting of morpholine, triethanolamine, diethanolamine, ethanolamine, ammonia, dimethylamine, and m-phenylenediamine.

51. The assembly of claim 48, wherein the wood-based panel comprises oriented strandboard.

52. A method for inhibiting stain formation in a covering overlaying a wood-based panel, comprising forming a coating on a surface of the panel supporting the covering, wherein the coating comprises:
   (a) a first stratum comprising a copper amine complex and a binder material; and
   (b) a second stratum comprising nonionic latex and inert filler particles,
   wherein the first stratum is intermediate the wood panel and the second stratum.

53. The method of claim 52, wherein the copper amine complex comprises an amine selected from the group consisting of morpholine, triethanolamine, diethanolamine, ethanolamine, ammonia, dimethylamine, and m-phenylenediamine.

54. The method of claim 52, wherein the copper amine complex comprises copper morpholine.

* * * * *